(12) United States Patent
Karlberg et al.

(10) Patent No.: US 11,968,214 B2
(45) Date of Patent: Apr. 23, 2024

(54) EFFICIENT RETRIEVAL AND RENDERING OF ACCESS-CONTROLLED COMPUTER RESOURCES

(71) Applicant: MICROSOFT TECHNOLOGY LICENSING, LLC, Redmond, WA (US)

(72) Inventors: Jan-Ove Almli Karlberg, Tromsø (NO); Åge Andre Kvalnes, Fetsund (NO); Tor Kreutzer, Tromsø (NO); Andrei-Alin Corodescu, Oslo (NO); Vidar Tveoy Knudsen, Oslo (NO); Helge Grenager Solheim, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 550 days.

(21) Appl. No.: 16/888,692

(22) Filed: May 30, 2020

(65) Prior Publication Data
US 2021/0288971 A1 Sep. 16, 2021

Related U.S. Application Data

(60) Provisional application No. 62/990,274, filed on Mar. 16, 2020.

(51) Int. Cl.
*H04L 9/40* (2022.01)

(52) U.S. Cl.
CPC .......... *H04L 63/105* (2013.01); *H04L 63/101* (2013.01)

(58) Field of Classification Search
CPC ... H04L 63/105; H04L 63/101; H04L 63/104; H04L 63/10; H04W 12/08; G06F 21/10
See application file for complete search history.

(56) References Cited

U.S. PATENT DOCUMENTS 8,601,539 B1 * 12/2013 Bobel .................. G06F 21/604
726/4
8,700,771 B1 * 4/2014 Ramankutty ......... H04L 63/101
709/225

(Continued)

OTHER PUBLICATIONS

Merlo, Alessio, and Alessandro Armando. "Cooperative access control for the grid." 2010 Sixth International Conference on Information Assurance and Security. IEEE, 2010. (Year: 2010).*

(Continued)

*Primary Examiner* — Theodore C Parsons
*Assistant Examiner* — Sameera Wickramasuriya
(74) *Attorney, Agent, or Firm* — Holzer Patel Drennan

(57) ABSTRACT

Particular aspects of this disclosure relate to computerized systems for generating and using improved data structures and functionality to efficiently render different multiple access-controlled resources (or properties of access-controlled resources) that are part of a concept. Often times, two or more resources of a concept or properties of a resource are subject to different access controls. This adds computing complexity as to whether or not a user is granted access to the entire concept or resource, a portion of the concept or resource, or none of the concept or resources and what exactly is surfaced back to the user when there are resources or properties the user does and does not have access to. Some embodiments accordingly render an efficient composite view of concepts or resources where some resources or properties are accessible by the requesting user, while other resources or properties are not accessible by the requesting user.

7 Claims, 20 Drawing Sheets

(56) References Cited

U.S. PATENT DOCUMENTS

| | | | |
|---|---|---|---|
| 8,752,167 B2* | 6/2014 | Jin | G06F 21/6218 726/21 |
| 8,924,468 B2* | 12/2014 | Jensen | H04N 21/43615 455/445 |
| 8,959,115 B2* | 2/2015 | Marathe | G06F 21/604 726/2 |
| 10,148,662 B1* | 12/2018 | Clark | G06F 16/2255 |
| 2004/0088563 A1* | 5/2004 | Hogan | G06F 21/629 705/51 |
| 2005/0114672 A1* | 5/2005 | Duncan | G06F 21/10 713/182 |
| 2005/0246762 A1* | 11/2005 | Girouard | H04L 63/104 726/2 |
| 2006/0120526 A1* | 6/2006 | Boucher | H04L 63/12 380/247 |
| 2007/0039045 A1* | 2/2007 | McKee | G06F 21/604 726/21 |
| 2008/0109897 A1* | 5/2008 | Moran | H04L 63/105 726/19 |
| 2011/0055918 A1* | 3/2011 | Keefe | G06F 21/6218 726/21 |
| 2011/0270886 A1* | 11/2011 | An | G06F 16/11 707/705 |
| 2012/0137213 A1* | 5/2012 | Hayler | H04L 63/083 715/239 |
| 2016/0063017 A1* | 3/2016 | Bartlett | G06F 16/245 707/759 |
| 2018/0027006 A1 | 1/2018 | Zimmermann et al. | |
| 2018/0293392 A1* | 10/2018 | Tsai | H04L 63/0823 |
| 2020/0323030 A1* | 10/2020 | Mehta | H04W 84/18 |

OTHER PUBLICATIONS

S. Yu, C. Wang, K. Ren and W. Lou, "Achieving Secure, Scalable, and Fine-grained Data Access Control in Cloud Computing," 2010 Proceedings IEEE INFOCOM, San Diego, CA, USA, 2010, pp. 1-9, doi: 10.1109/INFCOM.2010.5462174. (Year: 2010).*

"International Search Report and the Written Opinion Issued in PCT Application No. PCT/US2021/014478", dated May 3, 2021, 12 Pages.

* cited by examiner

| CONCEPT | RESOURCE | AGGREGATED ACL |
|---------|----------|----------------|
| A | 1, 2, 3, 4 | [ACE_a, ACE_b, ACE_c, ACE_d, ACE_e, ACE_f, ACE_g ... h, i] |
| B | 5, 6, 7 | [ACE_j, ACE_m, ACE_n, ACE_o] |

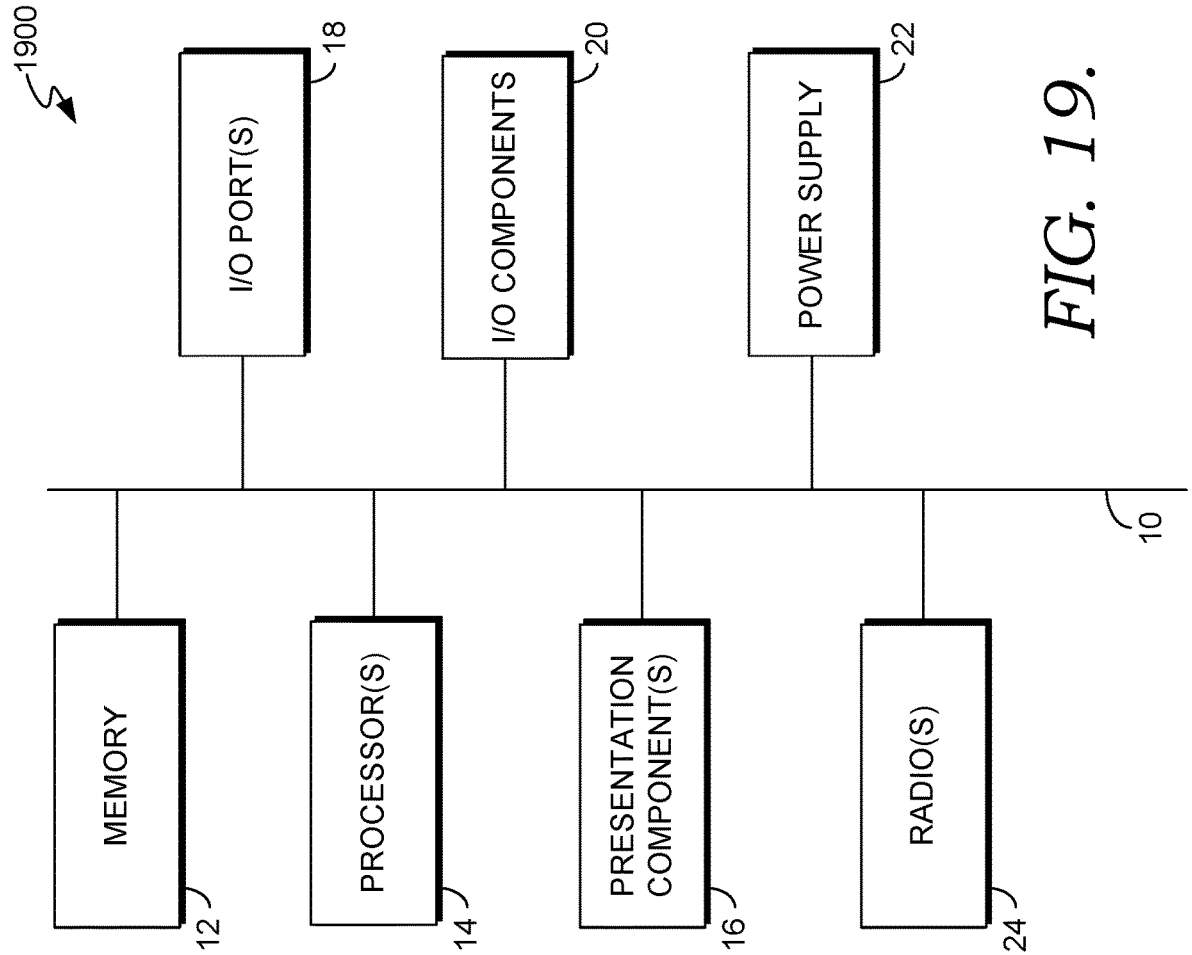

EFFICIENT RETRIEVAL AND RENDERING OF ACCESS-CONTROLLED COMPUTER RESOURCES

CROSS-REFERENCE TO RELATED APPLICATIONS

This application claims the benefit of U.S. Provisional Application No. 62/990,274, titled "Efficient Retrieval And Rendering Of Access-Controlled Computer Resources," filed Mar. 16, 2020, which is hereby expressly incorporated by reference in its entirety.

BACKGROUND

Often different types of people in an organization are permitted to access different levels of information, based on their role, qualifications, or other criteria. Computer-implemented technologies may be utilized to render access-controlled data to certain permitted users through the use of access-control management functionality. Access-control management refers to a technology infrastructure that help users, groups, or enterprises restrict access of particular resources (e.g., files, applications, documents, changes in network settings) through policies indicating who or what has specific privileges to such resources. Particular individuals or processes are "privileged" because they have the authority to make administrative changes or have other access rights (e.g., a read-only view privilege) to a resource, while others do not have such rights. For example, access-control management functionality can include restricting access of a particular application to a few select individuals (e.g., an administrator and a Chief Financial Officer) based on the individuals' company role.

Existing access-control management technologies typically overconsume computing resources. Generally, such solutions are costly in terms of throughput, latency, CPU utilization, I/O, and memory consumption, among other things. Further, the functionality of existing access-control management technologies is limited.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Particular aspects of this disclosure relate to computerized systems for using improved data structures and functionality to efficiently render different multiple access-controlled resources (e.g., files or applications) that are part of a concept (e.g., a topic or knowledge representation of information). In an example illustration of how concepts and resources are related, a user may issue a query that includes a request to obtain all information for the concept of "John Doe." There may be multiple resources or instances that need to be accessed to execute this query for John Doe, such as documents, inter/intranet sites, user profile services, chat services, email threads, location services, and the like. Often times, two or more resources of a concept are subject to different access controls. This adds computing complexity to determine whether a user should be granted access to the entire concept, a portion of the concept, or none of the concept and what exactly should be surfaced to the user when the concept includes both resources the user does and does not have access to. Some embodiments accordingly render an efficient composite view of concepts where some access-controlled resources are accessible by the requesting user, while other access-controlled resources are not accessible by the requesting user. Some embodiments render this composite view of concepts by generating a unique index data structure and/or resource data structure and using the data structure(s) at runtime to execute a query or request, which improves computing resource consumption, as described in more detail below.

Certain aspects of this disclosure additionally or alternatively determine how a concept is provided to a user given the user's access credentials and/or an access control list (ACL) associated with the set of resources from which the concept was derived. In some embodiments, an ACL indicates one or more particular access control levels required to access a corresponding resource. For example, an aggregated ACL data structure may combine corresponding ACLs for multiple resources associated with a given concept into a single record or entry. Such an aggregated data structure has efficiencies over data structures that, for example, store a record or entry for each ACL and resource, which is computing resource intensive, as described in more detail below.

Certain aspects of the present disclosure additionally or alternatively provide efficient access to properties (e.g., instances or sub-units) of resources that are represented in a key-value store. Some access control management systems grant access to resources (or a portion thereof) when the requesting users have access to the individual property requested. For example, a service, which can be a user, may request only a portion of a document, and the access control management system may return only that portion of the document if the service or other end-user has access control rights to that portion of the document. Additionally, particular aspects of the present disclosure utilize improved data structures that map a property of a resource to a corresponding key-value pair where each key represents a particular property of the resource and the value represents a page or memory storage unit (e.g., a page, frame, block, sector, chunk, or buffer) (also referred to herein as a "storage unit") that includes the ACLs or reference indicators needed to access the corresponding property. In some embodiments, the memory storage unit may be an access defining memory storage unit or an access inheriting memory storage unit. An "access defining memory storage unit" includes the ACL needed to access the corresponding property and refers to a class or parent object in which granting access for the corresponding property automatically grants access to the "access inheriting memory storage unit" and the access inheriting memory storage unit's corresponding property. In some embodiments, access inheriting memory storage units do not include a corresponding ACL but instead have a pointer value or other reference indicator that references the access defining memory storage unit governing access to the data on the access inheriting memory storage unit. By storing data, such as ACLs, on access defining memory storage units, instead of access inheriting memory storage units, it is possible to avoid computationally expensive ACL duplication while at the same time providing property level access control.

BRIEF DESCRIPTION OF THE DRAWINGS

Aspects of the disclosure are described in detail below with reference to the attached drawing figures, wherein:

FIG. 8 is a table illustrating an aggregated ACL, according to some embodiments of this disclosure;

FIG. 19 is a block diagram of an exemplary computing environment suitable for use in implementing embodiments described herein.

DETAILED DESCRIPTION

Figure 1:
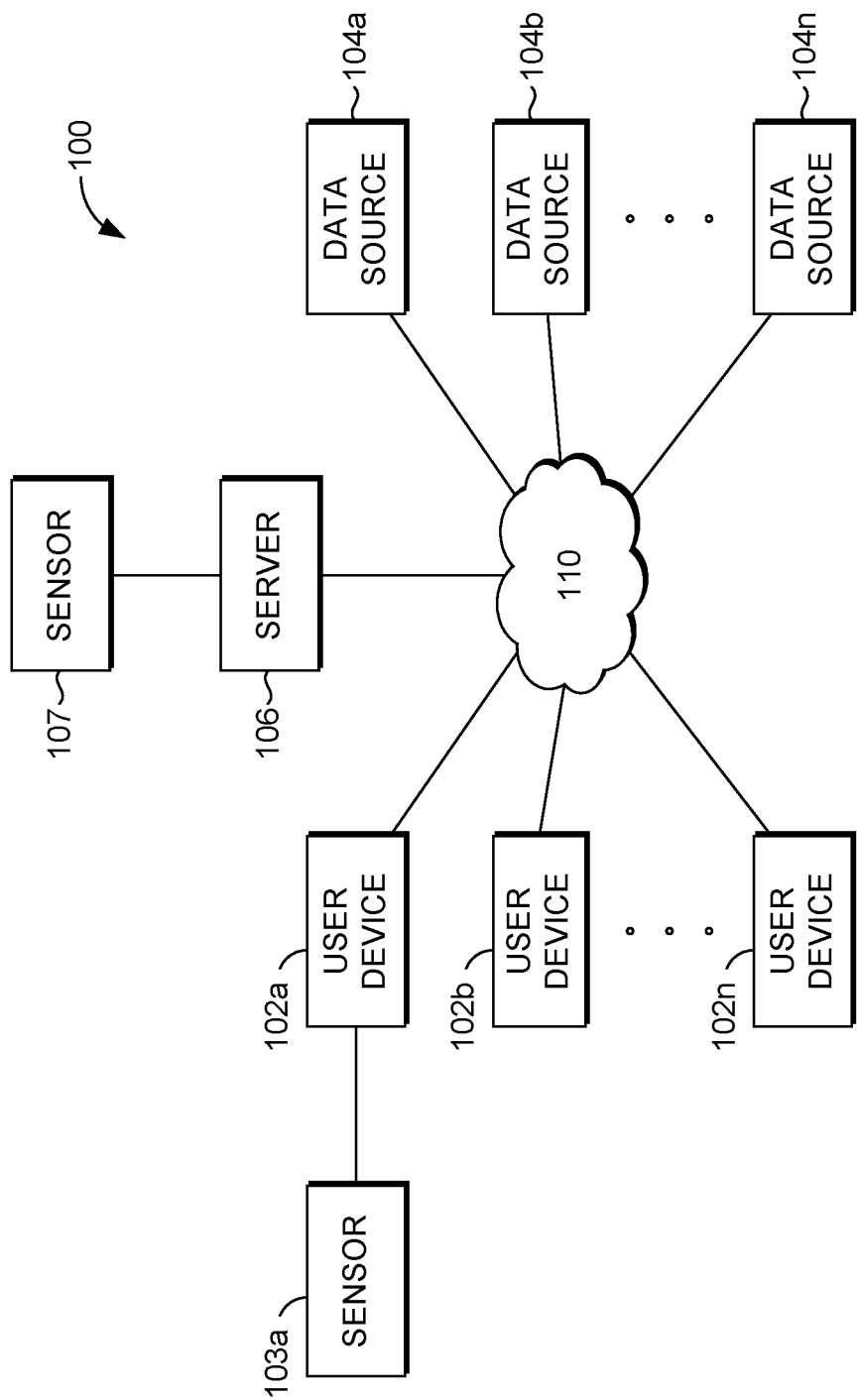
FIG. 1 is a block diagram of an exemplary computing environment suitable for use in implementing aspects of this disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Certain aspects of this disclosure generate and use improved data structures and functionality to efficiently render different access-controlled resources that are part of a concept. The term "concept" as described herein may comprise a topic, category, or knowledge representation, which may include or may be associated with one or more computer resources, instances, sub-categories, or sub-topics that describe the concept. A "computer resource" or "resource" as described herein refers to any data source, set of computer instructions (e.g., an app or web application), and/or any suitable data set that is accessible by a computing device. For example, a first resource can be a document, a second resource can be an intranet memory storage unit, a third resource can be a user profile, and a fourth resource can be a chat service thread, and the like. In an example of how concepts and resources are related, a user may issue a query that includes a request to obtain all information for the concept of "John Doe." There may be multiple resources or instances that need to be accessed to execute this query for John Doe such as documents, inter/intranet sites, user profile services, chat services, email threads, location services, and the like.

One problem is that often times two or more resources of a concept are subject to different access controls for the same access control management system and/or are subject to unique or different access control management systems (e.g., because they are hosted on different platforms of different enterprises). For example, using the illustration above, a first access control management system may only allow access to the document by John Doe himself, a second access control management system may allow a small group of people other than John Doe to access the intranet site's contents, and a third content management system may allow access to the email thread in response to successful authentication and authorization verification different than what is required for the document. This adds computing complexity to determine whether a user is granted access to the entire concept, a portion of the concept, or none of the concept and what exactly is surfaced to the user when the concept includes both resources the user does and does not have access to.

Some aspects of the present disclosure mitigate these problems, in addition to providing other benefits, by rendering an efficient composite view of concepts when some access-controlled resources are accessible by the requesting user, while other access-controlled resources are not accessible by the requesting user. Some embodiments render this composite view of concepts by generating a unique index data structure and/or resource data structure and using the data structure(s) at runtime to execute a query or request, which improves computing resource consumption, as described in more detail below. In an illustrative example of these data structures, some embodiments generate a mapping between each concept and every resource that belongs to that concept, in addition to generating a mapping of each resource of a concept to an access control list (ACL). An ACL indicates one or more particular access control levels needed to access a corresponding resource. Each access control level can specify an individual (e.g., a name of a person), user (e.g., a particular service or end user), or security groups whose members have access to the resources, required labels, information barriers, and the like. Each ACL includes one or more access control level identifiers (also referred to herein as an "access control entry" (ACE)) corresponding to one or more access control levels. For example, in order to access a first resource, the ACL may indicate "[security group A; security group B]," where "security group A" is a first access control level identifier and "security group B" is a second access control level identifier. This ACL may indicate that in order to access the first resource, the requesting user must need to be a member of "security group A" (e.g., a first committee) and/or "security group B" (e.g., a second committee). In this way, when a user requests access for a concept, some embodiments efficiently return only resources that the user has access to by comparing the user's access credentials (also referred to herein as "user claims" and "user claim set") with the one or more access control level identifiers. In some aspects, a "user claim set" may refer to the claims or access credentials the user possesses. Accordingly, different queries by different users for the same concept can result in different information being rendered depending on the access credentials of the users.

Certain aspects of this disclosure additionally or alternatively efficiently determine, using a unique data structure, how a concept is provided to a user given the user's access credentials and the ACLs associated with the set of resources from which the concept was derived. For example, the unique data structure can be an aggregated ACL data structure for a given concept where each resource's associated ACL is aggregated into a single record or entry, as opposed to a data structure that, for example, stores a record or entry for each ACL and resource, which is computing resource intensive, as described in more detail below. Some embodiments additionally deduplicate identical access control level identifiers within the ACL, which has computing performance benefits, as described in more detail below.

Some embodiments additionally or alternatively efficiently determine how a concept is surfaced based on a count of how many different resources a particular access control identifier is needed for or is otherwise associated with. Some access control management systems not only indicate which access control level identifiers are needed (referred to herein as "allow ACEs") to access a particular resource but may additionally or alternatively indicate which access control identifiers are to be denied access (referred to herein as "deny ACEs") to a particular resource. In this context, the aggregated ACL data structure may cause denied access for a first resource of a concept but grant access to a second resource of the same concept, which may cause denied access to the entire concept (i.e., all resources associated with the concept) even though the requesting user may technically have access to the first resource. For example, an aggregated ACL data structure may include a single entry where the allow ACEs for a first resource are [SecurityGroup_A, SecurityGroup_B] and deny ACEs for a second resource are [SecurityGroup_B, SecurityGroup_A]. Hypothetically, a user may be a member of "SecurityGroup_A." However, even though the user has access to the first resource given that the user is a member of SecurityGroup_A, the user may be denied access to the second resource because the user is a member of SecurityGroup_A. Because both sets of allow and deny ACEs may be part of the same entry or mapped to the same concept, the user may be denied access to both the first and second resource.

Some embodiments additionally increment each access control level identifier with a count of how many different resources it occurs in or is otherwise associated with. For example, using the illustration above, the updated aggregated ACL data structure may look like the following: the allow ACEs and deny ACEs are [{SecurityGroup_A, 10}, {SecurityGroup_B, 3}] respectively for the first resource. This aggregated ACL indicates that SecurityGroup_A occurs in the ACLs of 10 different resources and that SecurityGroup_B occurs in the ACLs of 3 resources. Some embodiments can grant or deny access to concepts by making inferences based on these counts. For example, some embodiments can determine what allow ACEs occur in the user claim set, select the allow ACE with the highest resource count (M), determine what deny ACEs occur in the user claim set, and sum the deny ACE resource counts (S). Accordingly, if M>S, then access can be granted to the concept. This is because it is implied that S is the exact number of resources with deny ACEs. (Had there been duplicates, S may only be equal to or less than the exact number of resources with deny ACEs.) So if M is larger than S, this implies that among the resources referred to by M there are some resources without any deny ACEs. Further, since the user has access to all resources referred to by M, then the user has access to at least (M minus S) resources from which the concept was derived. Using the illustration above, where the user is denied access because he is a member of SecurityGroup_A, even though SecurityGroup_A is in both allow ACEs and deny ACEs, the user can be granted access if her allow ACE count M is higher than all of the deny ACE counts S.

Certain aspects of the present disclosure provide efficient property access control where resources are represented in a key-value store. A "property" as described herein corresponds to an instance or other sub-unit of information within a resource. Some access control management systems grant access to resources (or a portion thereof) only if the users that request access have access to the individual property requested. For example, a service may request only a portion of a document and the access control management system may only return that portion of the document if the service (or other user) has access to that portion of the document. A "key-value store" as described herein is or includes a database or other data structure (e.g., a hash map or dictionary) that stores key value pairs. The key serves as a unique identifier that maps to a value. A search may be conducted on a key, which returns a value. The value can be stored as a binary object, semi-structured data, or any other suitable value.

Particular aspects of the present disclosure use improved data structures that map each property of a resource to a corresponding key-value pair where each key represents a particular property of the resource and the value represents a memory storage unit that includes the ACLs or reference indicators needed to access the corresponding property. In some embodiments, the memory storage unit is an access defining memory storage unit or an access inheriting memory storage unit. An "access defining memory storage unit" includes the ACL (and all access control level identifiers) needed to access the corresponding property and refers to a class or parent object in which granting access for the corresponding property automatically grants access to the "access inheriting memory storage unit" and the access inheriting memory storage unit's corresponding property. This is because an "access inheriting memory storage unit" corresponds to a child or instance of the access defining memory storage unit or respective property. In particular embodiments, data stored on an access inheriting memory storage unit is accessible to a user only if the user is granted access to the access defining memory storage unit. In this regard, if users have access rights to a property that is considered a class or parent, the users automatically have access rights to all species or child properties. In some embodiments, access inheriting memory storage units do not include a corresponding ACL but instead have a pointer value or other reference indicator that references the access defining memory storage unit governing access to the data on the access inheriting memory storage unit. By storing data, such as ACLs, on access defining memory storage units, instead of access inheriting memory storage units, it is possible to avoid expensive ACL duplication while at the same time providing property level access control. Further, this causes a processor not to repetitively read data (causing I/O overhead) because ACL values are only contained in access inheriting memory storage units and only those memory storage units that are a part of the same family are read, as opposed to other parent-child access defining/inheriting memory storage units. In particular, in existing technologies, each property of a resource and corresponding ACL is stored to a page, and a processor would have to read each ACL for each page. For instance, a processor requesting five properties of a ten-property resource would have to read five corresponding page's ACLs. However, as described in more detail herein, these five properties may be part of the same family. Therefore an advantage provided by the above described embodiments is that only one page's ACL would have to be read, thereby reducing I/O overhead.

Using an example illustration of property-level access control for embodiments, a resource document may include three properties—(1) aggregated sales data for an entire marketing department, (2) sales data for John Doe, who is a member of the marketing department, and (3) executive officer notes or comments for all of the sales data. Each of these properties may be represented as entries in a key-value store. The second property may be stored to a first access defining memory storage unit and the first property may be stored to a first access inheriting memory storage unit that is a child of the first access defining memory storage unit and has a pointer value that points to the first access defining memory storage unit. The third property may be stored to a second access defining memory storage unit, which has no access inheriting memory storage units. At runtime, a user, who has a claim set or access rights to properties 1 and 2, may request property 2-sales data for John Doe. Responsively, a processor may determine that the user has requested an access inheriting memory storage unit, read the pointer value, and compare the user claim set against the ACL found in the key-value pair for property 1. Because the user has access rights to the first parent access defining memory storage unit corresponding to the first property, the user is granted access to the second property and the processor has efficiently retrieved information without having read duplicate ACLs or other key-value entries, such as an entry corresponding to the third property.

As described above, existing technologies are inefficient in terms of computer resource consumption (e.g., CPU, memory, I/O, network latency) and functionality. For example, some embodiments consume an unnecessary amount of memory and are expensive in terms of I/O because property level retrieval has historically required properties of a resource to be sharded naively across multiple key-value pairs, which often leads to a massive duplication of ACLs. Put another way, existing technologies map each property of a resource to an ACL and the same ACLs are often needed for multiple properties of the same resource (or different resources). This causes duplicates of the same ACLs to be stored to memory, thereby causing storage overhead. Relatedly, this can increase storage device I/O (e.g., excess physical read/write head movements on non-volatile disk) because each time a processor reads the duplicated ACLs, components may have to repetitively reach out to the storage device to perform read/write operations, which is time consuming, error prone, and can eventually wear on components, such as a read/write head.

At least one way various embodiments of the present disclosure improve these existing technologies is by generating access defining memory storage units and access inheriting memory storage units and/or removing duplicate access control level identifiers needed to access resources for the same concept, thereby saving on memory storage costs. Further, since inheritance is supported via access defining memory storage units and access inheriting memory storage units, some embodiments reduce I/O costs because access inheriting memory storage units have pointer values or other references to ACLs of corresponding access defining memory storage units, as opposed to storing ACLs themselves. As described above, existing technologies require all ACLs of each property page to be read. Certain embodiments do not have to read ACLs unless and until the corresponding access defining memory storage unit of a particular property is referenced. In this way, these embodiments avoid having to read some ACLs because they are not contained in access inheriting memory storage units. Moreover, other unrelated access defining memory storage units corresponding to other properties are not read at all if they are not part of a family of properties, which reduces I/O overhead.

Another way various embodiments of the present disclosure improve these existing technologies is by generating an aggregated ACL, which reduces memory consumption and increases throughput, among other things. Existing technologies iterate over each resource needed for a concept and perform an access control check for each individual resource and grant access to the concept if the user has access to at least one of the resources. The performance of this "brute-force" approach, however, may be proportional to the number of resources (O(N) using Big-O notation). For example, in a situation where a user only has access to one resource and that resource is last in the iteration with N resources, access control checks would have to be performed for N resources. This causes an increase in CPU utilization and processing (e.g., fetch, decode, execute) and decreases throughput since each record corresponding to each resource in a data structure would have to be read before resources are returned. Various embodiments of the present disclosure improve these technologies by generating an aggregated ACL, which aggregates all resources to the same record or concept and/or removes duplicate access control level identifiers. Because duplicates are removed, the quantity of access control level identifiers that are compared against a user claim set is smaller. As such, determining access using the aggregated ACL is more efficient than performing the determining for all resources separately in terms of CPU utilization, memory, I/O, and throughput. Removing duplicates saves on memory storage. Additionally, generating an aggregated ACL (even without removing duplicates), causes CPU utilization and I/O to be reduced because a single entry containing multiple resources or ACLs of a concept is generated and read, as opposed to reading multiple entries with each corresponding to a different resource. Throughput is also increased since more data per time slice is processed due to the efficiency of the aggregated ACL.

Another way particular embodiments of the present disclosure improve these existing technologies is by generating an index data structure and/or resource data structure. As described above, existing technologies require an individual lookup functionality and data structure entry for each resource located for an individual concept, which is expensive in terms of I/O and throughput, among other things. Certain embodiments improve this because they map each concept to each resource needed for that concept (e.g., via individual entries in an index data structure) and/or these concepts can be efficiently mapped to the corresponding resource contents, as well as the ACLs needed for the resources (e.g., via a resource data structure). Accordingly, embodiments perform one or fewer I/Os for a given concept, given that each resource needed for a concept can be processed in parallel because a concept's resources are contained as a single entry. Those resources may reference the resource's contents ACLs as needed.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that operating environment 100 shown in FIG. 1 is an example of one suitable operating environment. Each of the components shown in FIG. 1 may be implemented via any type of computing device, such as computing device 1900 described in connection to FIG. 19, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment (e.g., a cloud computing infrastructure) that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 19 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100 (or systems 200, 300, and/or 400). Data sources 104a and 104b through 104n may be discrete from user devices 102a and 102b through 102n and server 106 (e.g., because they are distributed storage devices in a Storage Area Network (SAN)) or may be incorporated and/or integrated into at least one of those components. In one embodiment, one or more of data sources 104a through 104n comprise one or more sensors 103a, 107, which may be integrated into or associated with one or more of the user device(s) 102a, 102b, or 102n or server 106.

Figure 2:
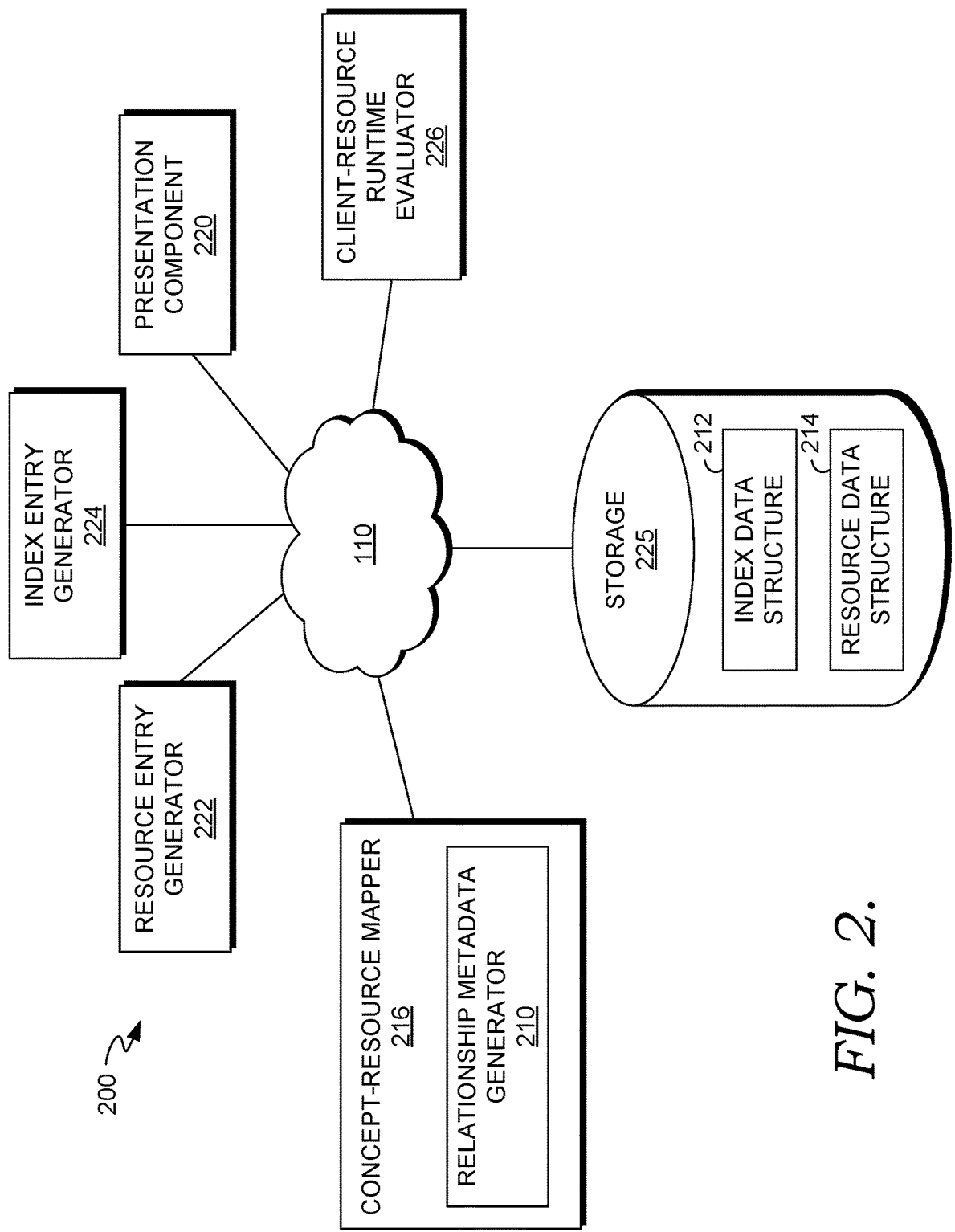
FIG. 2 is a block diagram illustrating aspects of an example system in which some embodiments of the present disclosure may be employed.
Figure 3:
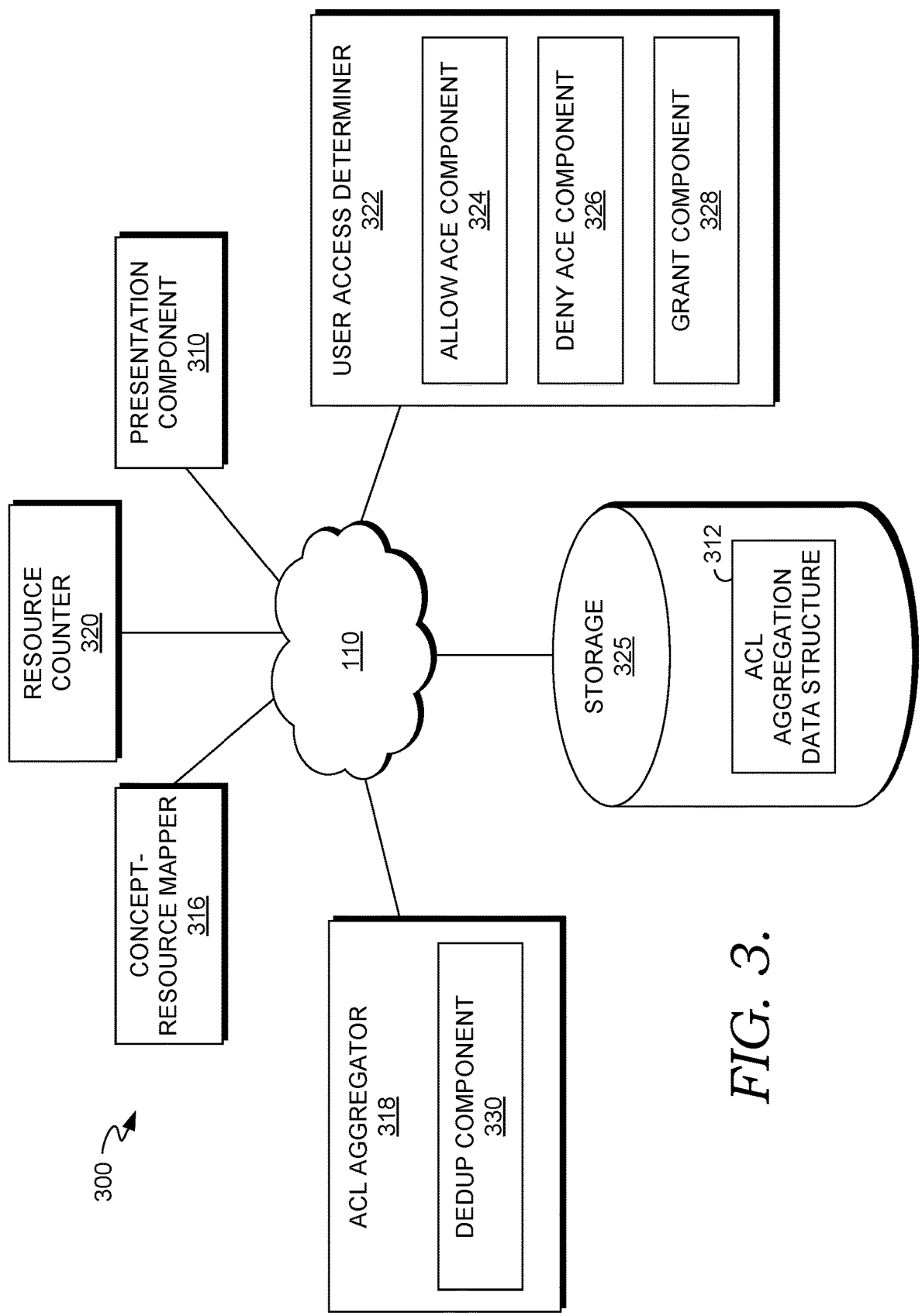
FIG. 3 is a block diagram illustrating aspects of an example system in which some of the embodiments of this disclosure may be employed.
Figure 4:
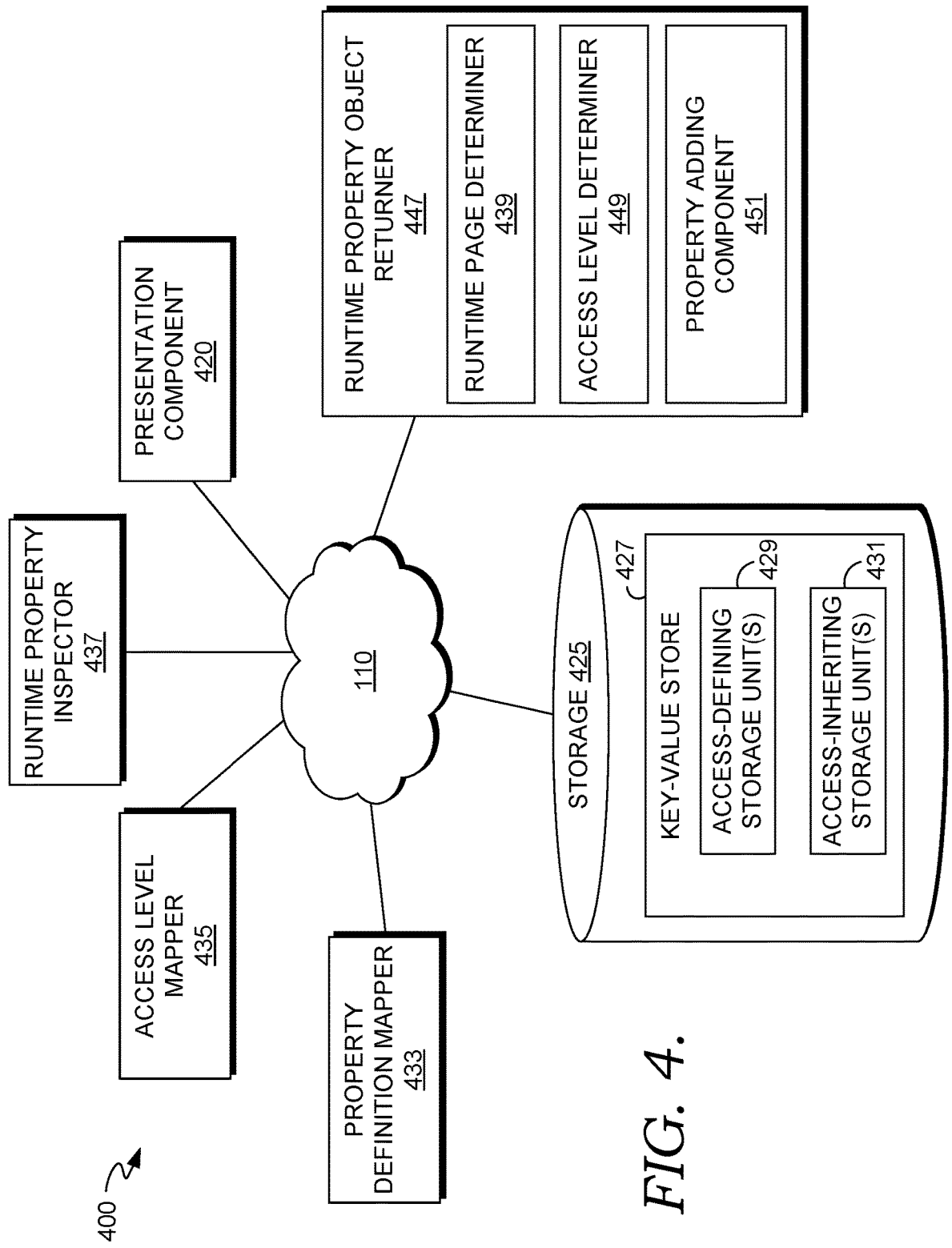
FIG. 4 is a block diagram illustrating aspects of an example system in which some embodiments of this disclosure may be employed.

Operating environment 100 can be utilized to implement one or more of the components of the systems 200, 300, and/or 400 as described with respect to FIG. 2, FIG. 3, and FIG. 4 respectively. Operating environment 100 also can be utilized for implementing aspects of process flows 1300 through 1800 of FIGS. 13-18. Referring now to FIG. 2, with FIG. 1, a block diagram is provided showing aspects of an example computing system architecture suitable for implementing an embodiment of the disclosure and designated generally as composite view system 200. The composite view system 200 represents only one example of a suitable computing system architecture. Other arrangements and elements can be used in addition to or instead of those shown (e.g., as illustrated in the system 300 and 400 of FIGS. 3 and 4 respectively), and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of composite view system 200 including the concept-resource mapper 216, the resource entry generator, the index entry generator, the presentation component 210, the client-resource runtime evaluator, and the storage 225. These components are generally responsible for efficiently rendering one or more access-controlled resources to a user for a given concept, such as a composite view of access-controlled resources that the user has access to and does not have access to. These components may be embodied as a set of compiled, interpreted, or executable computer instructions or functions, program modules, computer software services, or an arrangement of processes carried out on one or more computer systems, such as computing device 1900 described in connection to FIG. 19, for example.

In one embodiment, the functions performed by components of system 200 are associated with one or more web applications, apps, plugins, APIs, services, or routines. In particular, such components may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components.

Web applications, apps, or other user experiences may attempt to connect and gather knowledge for a concept that has resources spread throughout different data sources (e.g., the data sources 104 of FIG. 1) within an enterprise or across different enterprises. For example, using a web application of user device 102a, a user may initiate a request for the concept "machine learning" (ML), by issuing a query for the term "machine learning." The resources or knowledge related to this concept may be gathered from different heterogeneous data sources, such as documents, internet sites, intranet sites, user/customer profile services, chat/communication services, and the like. Common for many of these data sources is that they have associated access control requirements. For example, only people who have access to the document or other resource can open or see the contents of such resource. However, there may be different access control requirements for each resource. This adds computing complexity to determine whether a user is granted access to the entire concept, a portion of the concept, or none of the concept and what exactly is surfaced to the user when the concept includes both resources the user does and does not have access to. Some embodiments of the present disclosure overcome these deficiencies using the index data structure 212 and/or the resource data structure 214. The index data structure 212 and the resource data structure 214 may be any suitable data structures or set of data structures (e.g., an embedded data structure within another data structure). For example, these data structures may come in the form of a key-value store, hash map, dictionary, list, and/or lookup table, and/or any other suitable data structure.

The resource data structure 214 is generally responsible for storing access-controlled resources (and, optionally, other non-access controlled resources) and their contents (and/or pointer to the contents) that together form the corpus of knowledge/information of an enterprise or set of enterprises. For example, the resource data structure 214 may store documents, intranet memory storage units, emails, chat/communication messages, user profiles, and the like. In some embodiments, in addition to providing storage for these resources, the resource data structure 214 enforces access controls. For example, when a request is made for a resource in the resource data structure 214, the user's access credentials may be verified to have access to the resource before it is returned. The schema of the resource data structure 214 for resources can be modeled and implemented in various ways. For example, some embodiments of the resource data structure 214 include a mapping that associates an ACL with each resource. Some embodiments additionally include other metadata, such as a timestamp and other information, as described in more detail below. At runtime or query time, when an attempt is made to retrieve a resource (or metadata, as described in more detail below) on behalf of a user, the claim set of the user is evaluated against the corresponding ACL to determine access.

The index data structure 212 is generally responsible for storing a mapping of a given concept to one or more resources or resource IDs. In some embodiments, the index data structure 212 is an auxiliary (helper) data structure to the resource data structure 214 by containing indexes from an external key (as opposed to a primary key of the resource data structure 214) to a set of entries in the resource data structure 214. In particular embodiments, each record within the index data structure 212 contains a set of index entries, which are each described by one or more property bags, metadata, and/or a reference (e.g., a pointer value) to an entry or record within the resource data structure 214. Accordingly, by looking up a record in the index data structure 212, embodiments locate a set of resources in the resource data structure 214. Examples of these embodiments are described in FIGS. 5A and 5B, which are described in more detail below. In some embodiments, the index data structure 212 is not required or may be combined with the resource data structure 214. For example, in some embodiments, the resource data structure 214 alternatively stores a mapping of a given concept to one or more resources.

The concept-resource mapper 216 is generally responsible for associating or mapping each concept (e.g., of a predefined set of concepts) to one or more resources or vice versa. For example, some embodiments leverage manual annotations (e.g., user requests), link analysis, statistical, and/or machine level models to make such association. For example, word embedding vector models such as WORD2VEC can be used to map a set of resources that are within a threshold distance of each other to their nearest categorical or semantic term in vector space, which would represent a concept.

Some embodiments detect read or change requests (e.g., update, create, delete) to the corpus of access-controlled resources, which can trigger the concept-resource mapper 216 functionality. The concept-resource mapper 216 also includes functionality that indicates a set of relationships associated with a particular concept as input by the relationship metadata generator 210. A "relationship" as described in this context can include any suitable metadata that describes how a concept is related to a particular resource. For example, the relationship metadata generator 210 may input a timestamp within a record of the index data structure 212, which describes when the concept-association was made by the concept-resource mapper 216, how this association was made (e.g., via manual annotations or other automated semantic analysis), and/or any other suitable metadata as an output by the concept-resource mapper 216. In some embodiments a concept may be predetermined or exist before runtime or a query is executed, such as being defined at build or compile time. Alternatively, in some embodiments, a concept may be determined (e.g., the concept-resource mapper 216 may determine which concept a set of resources belong to) at runtime or in response to a query or other request being issued.

In some embodiments, the metadata that the relationship metadata generator 210 generates includes "relationship type," which indicates a category or class of relationship that defines the relationship between a given resource and a concept and/or other resources mapped to the same concept. In some embodiments, the metadata may additionally or alternatively include a "reason" indicator, which provides more detailed information for the relationships type so that users or embodiments can better understand how a particular resource is related to particular a concept and/or other resources for the same concept. For example, a relationship type may be "related person," which indicates that one or more persons associated with the resource are related to the concept and/or another resource mapped to the concept. The reason indicator in this instance may, for example, identify each user or person that is related to the corresponding concept based on their specific user activity (e.g., clicks, selections, queries, or other user input) on the corresponding resource or references within the resource (e.g., their name may be listed in the reference). In illustrative example, a user may modify or author a particular document, or may be mentioned or referenced by an email address in a document. Accordingly, the relationship type may be "related person," and the reason indicator may specify the name or ID of the user and the specific modification (e.g., delete Y, insert X).

In some embodiments, the relationship type is a "related document" identifier, which indicates that there is a related document to a concept (or other resource) for a given resource. The related document reason indicator may specifically describe why a resource is related to a given concept (or other resources for the same concept). For example, reasons can be that the document contains a particular paragraph, sentence, phrase, acronym, and/or the like that matches one or more terms of a concept (or has the same semantic meaning as the concept).

In some embodiments, relationships are extracted from access-controlled resources themselves and so access to those relationships is also protected by access control mechanisms. For example, any relationship described above (e.g., related person, reason, and/or timestamp) may be subject to the same access controls as that of the corresponding resource contents. Accordingly, any information described by a relationship between a concept and a resource may be presented only to users who have access to the resource itself. In some embodiments, relationships are additionally or alternatively extracted from data sources outside the access-controlled resources themselves, such as data from public internet sources, any data input by users, or any other resources. In some embodiments, relationships are additionally or alternatively public or not access-controlled. In some embodiments, relationships are additionally or alternatively obfuscated, encrypted, masked, or otherwise scrambled so that the relationships true contents are not presented so that users are unable to discern the contents.

In various embodiments, in response to the concept-resource mapper 216 performing its functionality, the resource entry generator 222 and the index entry generator 224 map the concept(s), resource(s), and/or relationship(s) into the index data structure 212 and/or the resource data structure 214. The resource entry generator 222 is generally responsible for generating one or more records or entries and/or contents (or values) within the resource data structure 222. For example, the resource entry generator 222 may populate the resource data structure 214 with the resource along with its associated ACL. This may make it possible to retrieve the resource if a user has access to it. The index entry generator 224 is generally responsible for generating one or more records or entries and/or contents (or values) within the index data structure 212. For example, the index entry generator 224 may populate the index data structure 212 with one or more concepts, each resource that belongs to the one or more concepts, and/or any of the relationships described above. In some embodiments, the index entry generator 224 updates the index data structure 212 by adding a new entry for each relationship defined, although each new entry may still be part of the same index record since it belongs to the same concept. In this way, each new entry acts as a sub-entry or instance of the larger entry or record corresponding to the concept. These embodiments are described in more detail below with respect to FIGS. 5A and 5B. It is understood, however, that in some embodiments concepts may be broken up into multiple records where each record is made based on the particular relationships such that there is one record per relationship. This is because there may be an inherent tradeoff between keeping all index entries for a concept in a single record versus splitting them across multiple records, which each is identified by the concept plus relationship type. If some user experiences need only relationships of a certain type, building one record per relationship type may be more efficient at query time so that embodiments do not have to continuously read multiple relationships for the same record.

In some embodiments, based on the resource entry generator 222 and the index entry generator 224 generating their respective information, index records are updated with index entries linking concepts to resources. In some embodiments, in response to generating the indexes in the index data structure 212 and the access-controlled resources in the resource data structure 214, embodiments are ready to execute runtime operations, such as queries by a user. In this way, in some embodiments, the functionality of the concept-resource mapper 216, the resource entry generator 222, and the index entry generator 224 occur offline or before runtime operations are executed. In some embodiments, in response to these components performing their functions, particular embodiments generate (and/or link to) one or more Application Programming Interfaces (APIs) for executing queries or requests on behalf of a user, where the result is a synthesized composite view of a concept. For example, different resources may be stored to different hosts, enterprises, or other data sources and so access to those data sources may require APIs in order to link one or more components in the system 200 and the data sources. The information returned may vary across users based on which resources are accessible to them.

The client-resource runtime evaluator 226 is generally responsible for at least partially executing a runtime query or request of a user via comparing the user claim(s) or access credentials to corresponding ACLs associated with particular resources of a concept that the user has requested. The user can request one or more concepts, one or more resources within a concept, and/or other information that includes one or more concepts or resources. For example, a user, having access credentials A and B, may request concept C. Responsively, embodiments can locate the concept C within the index data structure 212, determine that there are resources 1, 2, and 3 mapped to the concept and compare the access credentials to the ACL of each resource, which is indicated in the resource data structure 214. The ACL of each resource may indicate access control level indicators A or B, which match the access credentials of the requesting user. Accordingly, because of the match, embodiments may return all of the associated resources for concept C. Various embodiments of the client-resource runtime evaluator 226 are described in more detail below.

Example system 200 also includes a presentation component 220 that is generally responsible for presenting content and related information to a user, such as information contained in the index data structure 212 and/or resource data structure 214 that the requesting user has access to. Such presentation may occur in response to the client-resource runtime evaluator 226 ensuring that the user has access to one or more resources for the concept. Presentation component 220 may comprise one or more applications or services on a user device, across multiple user devices, or in the cloud. For example, in one embodiment, presentation component 220 manages the presentation of content to a user across multiple user devices associated with that user. Based on content logic, device features, associated logical hubs, inferred logical location of the user, and/or other user data, presentation component 220 may determine on which user device(s) content is presented, as well as the context of the presentation, such as how (or in what format and how much content, which can be dependent on the user device or context) it is presented and/or when it is presented.

In some embodiments, the presentation component 220 provides a composite view of the content of the resources (and/or resource identifiers) that the user has access to via the client-resource runtime evaluator 226. For example, embodiments can provide on a single screen various strings of content from each resource that the user has access to while at the same time not providing any information for resources that the user does not have access to. Alternatively or additionally, some embodiments can provide obfuscated, encrypted, or other scrambled data identifiers so that the user cannot view the content and/or identifier of resources the user does not have access to. In some obfuscation embodiments, presentations of data can come in the form of semantic category or other general description language that is broader than the actual contents it represents. Such semantic category can be determined via any suitable methods described herein, such as manual annotations, WORD2VEC, NLP, or other semantic analyzer engines.

In some embodiments, presentation component 220 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, the presentation component 220 generates structured data, tagged data or otherwise causes presentation of structured or tagged data that was previously unstructured, semi-structured, or untagged. For example, in some embodiments the presentation component 220 causes presentation of the index data structure 212 and/or the resource data structure 214, the contents of which may have been previously unstructured or otherwise been in a different form than the output provided by the presentation component 220. In this way, some embodiments convert input data to an output that is different than the input. For example, the inputs can be multiple documents or other resources described herein and the output can be a single composite view of the documents that the user has access to, which represent only a portion of the multiple documents Example system 200 also includes storage 225. Storage 225 generally stores information including data, data structures, computer instructions (e.g., software program instructions, routines, or services), and/or models (e.g., machine learning models) used in some embodiments of the technologies described herein. In an embodiment, storage 225 comprises a data store (or computer data memory). Further, although depicted as a single data store component, storage 225 may be embodied as one or more data stores or may be in the cloud. As described above, the storage 225 may include the index data structure 212 and the resource data structure 214.

Turning now to FIG. 3, example system 300 includes network 110, which is described in connection to FIG. 1, and which communicatively couples components system 300 including the concept-resource mapper 316, the ACL aggregator 318, the resource counter 320, the user access determiner 322, the presentation component 310, and the ACL aggregation data structure 312. These components are generally responsible for efficiently determining how a concept is rendered to a user given the user's access credentials and the ACLs associated with the set of resources from which the concept was derived by using an ACL aggregation data structure 312. These components may be embodied as a set of compiled, interpreted, or executable computer instructions or functions, program modules, computer software services, or an arrangement of processes carried out on one or more computer systems, such as computing device 1900 described in connection to FIG. 19, for example. In some embodiments, the system 300 is a part of or included in the system 200 of FIG. 2.

In one embodiment, the functions performed by components of system 300 are associated with one or more web applications, apps, plugins, APIs, services, or routines. In particular, such components may operate on one or more user devices (such as user device 102a), servers (such as server 106), may be distributed across one or more user devices and servers, or be implemented in the cloud. Moreover, in some embodiments, these components of system 300 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 300, it is contemplated that in some embodiments functionality of these components can be shared or distributed across other components.

Web applications, apps, or other user experiences may attempt to connect and gather knowledge for a concept that is spread throughout different data sources (e.g., the data sources 104 of FIG. 1) within an enterprise or across different enterprises. When a concept is derived from a set of resources (or a set of resources are derived from a concept), determining whether a particular user has access to the concept entails establishing whether the user has access to one or more resources associated with the concept. This may be implemented by iterating over all resources and performing access control checks for each individual resource and granting access to the concept if the user has access to at least one of the resources, which would be considered a "brute-force" approach. The performance of this approach, however, is at worst proportional to the number of resources (O(N) using Big-O notation). For example, consider a situation where a user only has access to one resource and that resource is the last in the iteration of a table structure. If a user requested N resources however, access control checks may have to be performed for N resources.

Certain embodiments of the present disclosure overcome these deficiencies, among other benefits, by generating and using an ACL aggregation data structure 312. The ACL aggregation data structure 312 may be any suitable data structure or set of data structures (e.g., an embedded data structure within another data structure). For example, this data structure may be a key-value store, hash map, dictionary, list, and/or lookup table, and/or any other suitable data structure. In some embodiments, the ACL aggregation data structure 312 is included in the index data structure 212 and/or the resource data structure 214 of FIG. 2, and/or is a data structure that references (or is referenced by) the index data structure 212 and/or the resource data structure 214. The ACL aggregation data structure 312 is generally responsible for storing or aggregating multiple resources' associated ACLs into a single record or entry for a given concept. This aggregation can occur even where the corresponding ACLs have different values, as opposed to a data structure that, for example, stores a record or entry for each ACL and resource, which is computing resource intensive, as described above. Examples of the ACL aggregation data structure 312 are described with respect to FIG. 8.

The concept-resource mapper 316 is generally responsible for associating or mapping each concept (e.g., of a predefined set of concepts) to one or more resources or vice versa. In some embodiments, the concept-resource mapper 316 is the same as or represented by the concept-resource mapper 216 of FIG. 2. The ACL aggregator 318 is generally responsible for aggregating or combining each resource's ACLs into a single record or entry for a given concept. For example, in response to the concept-resource mapper 316 identifying a concept and mapping the concept to a set of resources, the ACL aggregator 318 may aggregate each of those resource's ACLs into a single record or entry within the ACL aggregation data structure 312.

The dedup component 316 is generally responsible for deduplicating redundant access control level identifiers within the aggregated ACL. Accordingly, the dedup component 316 removes or deletes access control level identifiers within the aggregated ACL that are duplicates such that there is only one value reflected for a given access control identifier, instead of multiple. For example, initially an aggregated ACL may include the following ACL: resource A—[SecurityGroup_A, SecurityGroup_B]; resource B—[SecurityGroup_A, SecurityGroup_C]. In this example, the dedup component 316 would remove one of the access control level identifiers "SecurityGroup_A," since these are duplicates such that the new aggregated ACL should be [SecurityGroup_A, SecurityGroup_B, SecurityGroup_C]. Because redundant data is removed, the number of access control level identifiers that must be checked for occurrence in a user claim set is smaller. Accordingly, determining access using the aggregated ACL is more computer resource efficient than performing the determining for all resources separately, as described above.

The resource counter 320 is generally responsible for counting how many resources for a given concept require (and/or deny) a given access control level (or access control level indicator) for access and populating those counts within the ACE aggregation data structure 312. Put another way, the resource counter 320 indicates how many resources contain a particular access control level indicator in their respective ACLs. Some embodiments calculate the quantity of resources that require or need a particular access control level in order to be accessed (i.e., "allow ACEs"). Additionally or alternatively, some embodiments calculate the number of resources that the user will be denied if they are members of a particular access control level (i.e., "deny ACEs"). For example, the resource counter 320 may calculate that the access control level indicator "SecurityGroup_A" occurs in the ACLs of 10 different resources for the same concept, indicating that 10 resources require membership to this group. Additionally, the resource counter 320 may calculate that the access control level indicator "SecurityGroup_B" occurs in the ACLs of 5 different resources for the same concept, indicating that 5 resources will be denied access if the user claim set includes SecurityGroup_B.

The user access determiner 322 is generally responsible for determining whether the requesting user has access to a given concept (or resources that are part of a concept). The user access determiner 322 includes the allow ACE component 324, the deny ACE component 326, and the grant component 328. In some embodiments, the user access determiner 322 alternatively includes the same or similar functionality to the client-resource runtime evaluator 226. In some embodiments, the user access determiner 322 determines whether the requesting user has access to a concept based on the resource counter 320 counts. For example, the allow ACE component 324 and the deny ACE component 326 may use information from the resource counter 320 to perform their functionality. The allow ACE component 324 is generally responsible for determining how many allow ACE access control level identifiers of a concept (i.e., within the ACL aggregation data structure 312) match or occur in a user claim set. In some embodiments, for those access control level identifiers that match the users claim set, the allow ACE component 324 additionally selects the access control level identifier with the highest count (as determined by the resource counter 320), which is denoted herein as M. The deny ACE component 326 is generally responsible for determining how many deny ACE access control level identifiers of a concept (within the aggregation data structure 312) match or occur in a user claim set. In some embodiments, for those deny ACE access control level identifiers that match a user claim set, the deny ace component 326 sums the counts, which is denoted herein as S. For example, there may be a total of 20 different or unique deny ACE access control level identifiers that occur in a user claim set.

The grant component 328 is generally responsible for granting or denying access to a concept based on the functionality of the resource counter 320, the allow ACE component 324 and/or the deny ACE component 326. For example, in some embodiments, the grant component 328 grants access to an entire concept and all of its resources (or particular resources of the concept) if the counts of the allow ACE component 324 (i.e., M) is higher than the counts of the deny ACE component 326 (i.e., S). Such access grant may be provided because embodiments remove (e.g., via the dedup component 330) duplicate access control level identifiers. This implies that M is equal to the number of resources with deny ACEs. Accordingly, if M is larger than S, this implies that among the resources referred to by the allow ACE component 324, there may be some resources without any deny ACEs. Further, because the user has access to all resources referred to by M, it can be concluded that the user has access to at least M minus S resources from which the concept was derived.

Example system 300 also includes a presentation component 320 that is generally responsible for presenting content and related information to a user, such as any information contained in the ACL aggregation data structure 312 that the user has access to. Such presentation may occur in response to the user access determiner 322 ensuring that the user has access to one or more resources for the concept. Presentation component 320 may comprise one or more applications or services on a user device, across multiple user devices, or in the cloud. For example, in one embodiment, presentation component 220 manages the presentation of content to a user across multiple user devices associated with that user. Based on content logic, device features, associated logical hubs, inferred logical location of the user, and/or other user data, presentation component 220 may determine on which user device(s) content is presented, as well as the context of the presentation, such as how (or in what format and how much content, which can be dependent on the user device or context) it is presented and/or when it is presented. In some embodiments, the presentation component 320 is identical or similar to the presentation component 220.

In some embodiments, presentation component 320 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, the presentation component 320 generates structured data, tagged data or otherwise causes presentation of structured or tagged data that was previously unstructured, semi-structured, or untagged. For example, in some embodiments the presentation component 320 causes presentation of the ACL aggregation data structure 312, the contents of which may have been previously unstructured or otherwise been in a different form than the output provided by the presentation component 220. In this way, some embodiments convert input data to an output that is different than the input. For example, the inputs can be multiple documents or other resources described herein and the output can be a single view of a concept and each of its associated resources.

Example system 300 also includes storage 325. Storage 325 generally stores information including data, data structures, computer instructions (e.g., software program instructions, routines, or services), and/or models (e.g., machine learning models) used in particular embodiments of the technologies described herein. In an embodiment, storage 325 comprises a data store (or computer data memory). Further, although depicted as a single data store component, storage 225 may be embodied as one or more data stores or may be in the cloud. As described above, the storage 325 includes the ACL aggregation data structure 312.

Turning now to FIG. 4, example system 400 includes network 110, which is described in connection to FIG. 1, and which communicatively couples components of the system 400, including the property definition mapper 433, the access level mapper 435, the runtime property inspector 437, the presentation component 420, the runtime property object returner 447, and the key-value store 427. These components are generally responsible for providing property level access control in key-value store representations. These components may be embodied as a set of compiled, interpreted, or executable computer instructions or functions, program modules, computer software services, or an arrangement of processes carried out on one or more computer systems, such as computing device 1900 described in connection to FIG. 19, for example. In some embodiments, the system 400 is a part of or included in the system 200 of FIG. 2 and/or the system 300 of FIG. 3.

In one embodiment, the functions performed by components of system 400 are associated with one or more web applications, apps, plugins, APIs, services, or routines. In particular, such components may operate on one or more user devices (such as user device 102a), servers (such as server 106), may be distributed across one or more user devices and servers, or be implemented in the cloud. Moreover, in some embodiments, these components of system 400 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 400, it is contemplated that in some embodiments functionality of these components can be shared or distributed across other components.

Key-value stores are commonly used in cloud services and other architectures to host data. These provide a convenient interface where it is possible to retrieve a data item for a given key. This interface may result in reduced performance, especially in situations where values, such as property values, are large, as excessive amounts of data must be read and transferred over a network.

One way to alleviate the performance problems of key-value stores is to split (i.e., shard) each item or resource into multiple key-value pairs. This makes it possible to achieve better performance and reduce performance consumption when subsets of a resource are needed, as unnecessary data no longer must be read or retrieved and/or transferred over a network, thereby improving I/O costs, network packet generation costs (e.g., building headers for TCPIP packets), throughput, etc.

Some embodiments employ access management systems that are fine-grained in that there are property access control mechanisms for one or more properties of a single resource. For example, for a first resource, a first property set may only be accessible to a set of users U, while other properties of the first resource have more restrictive access controls and are accessible only to a subset U'.

Various embodiments of the present disclosure utilize a key-value store 427, which includes one or more access-defining memory storage units 429 and one or more access inheriting memory storage units 431. In some embodiments, the access defining memory storage unit(s) 429 include the ACL required to access the corresponding property as well as the corresponding property's contents. In some embodiments, when a user's access credentials meet this ACL, access is granted to this memory storage unit itself, as well as other inheriting memory storage units. In some embodiments, the access inheriting memory storage unit(s) 431 do not contain an ACL, but instead includes a pointer value or other reference to the access level governing access to the properties on the access inheriting memory storage unit(s) 431. Such reference in various embodiments includes reference to the access defining memory storage unit(s) 427 that are parent objects to its children access inheriting memory storage unit(s). In some embodiments, properties/data stored on the access inheriting memory storage unit(s) 431 is accessible to a user only if the user is granted access based on the ACL on the corresponding access defining memory storage unit(s) 429.

Some embodiments of the present disclosure generate and use two data structures (not shown) stored in the key-value store 427 called a property definition table and an access level table. The property definition table is generally responsible for storing a mapping from a property name to a property definition. In some embodiments, a property name can include an item or property ID as well as the memory storage unit ID (corresponding to the access defining memory storage unit(s) 429 or the access inheriting memory storage unit(s) 431) that the property's contents are located on. In some embodiments, the property definition includes an identifier of the memory storage unit (i.e., memory storage unit ID) where the property value/content is stored. The memory storage unit ID can be any suitable value, such as a positive integer or other real number or character sequence. In some embodiments, the memory storage unit ID acts as a key for retrieving a specific memory storage unit (i.e., the access defining memory storage unit(s) 429 or the access inheriting memory storage unit(s) 431), which can be generated by adding the memory storage unit ID to an external item ID. In some embodiments, the property definition table also includes the specific access control level identifier(s) that grants access to the property. The access level table is generally responsible for storing a mapping from access level (ACL ID) to the identifier of the access defining memory storage unit on which the ACL is stored.

The property definition mapper 433 is generally responsible for mapping a particular property ID to a property definition (e.g., the access control level identifier needed to access the corresponding property). In some embodiments, the property definition mapper 433 populates the property definition table by mapping from a property name to a property definition as described above. The access level mapper 435 is generally responsible for mapping a particular access control level identifier needed to access a corresponding property to the access defining memory storage unit(s) 429 where the ACL is stored for the corresponding property. In some embodiments, the access level mapper 435 populates the access level table described above.

The runtime property inspector 437 is generally responsible for identifying and mapping the specific property(s) a user has requested to the specific memory storage unit IDs that must be read to access the corresponding property(s). For example, some embodiments use the property definition and access level tables described above. In an illustrative example, the runtime property inspector 437 initializes an empty set of memory storage units that should be read. For each requested property, embodiments look up the property definition in the property definition table. Then some embodiments add the memory storage unit ID from the property definition to the set and using the access control level identifier from the property definition as the key, embodiments look up the memory storage unit ID on which the property ACL is stored in the access level table and the memory storage unit ID is added to the set.

The runtime property object returner 447 includes the runtime memory storage unit determiner 439, the access level determiner 449, and the property adding component 451. The runtime property object returner 447 is generally responsible for providing the requesting user the properties the user has requested based on the type of memory storage unit the property is associated with and comparing the user claims to the ACL of the property. In some embodiments, after the set of memory storage units that must be read have been determined via the runtime property inspector 437, the memory storage units are read from the store and the properties are returned to the user that requested the properties. To ensure that only those properties that the user has access to are returned, the runtime memory storage unit determiner 439, the access level determiner 449, and the property adding component are utilized.

The runtime memory storage unit determiner 439 is generally responsible for determining whether the memory storage unit is one of the access defining memory storage unit(s) 420 or an access inheriting memory storage unit(s) 431. In some embodiments, if the memory storage unit is an access defining memory storage unit, an access control check is executed via the access level determiner 449 using the ACL present on the memory storage unit and the user claim set. That is, the ACL is compared against the user claim set to determine whether each access control level identifier is contained somewhere in the user claim set. Various embodiments store the results in a mapping structure where the key is the access control level identifier, and the value is a Boolean value (true or false) indicating whether the user has access or not. In some embodiments, if it an access inheriting memory storage unit, embodiments read the pointer value or reference to the associated access defining memory storage unit and the process described above for the access inheriting memory storage unit(s) 431 is repeated.

The property adding component 451 grants access to and presents the requested properties or denies access to and does not present the requested properties based on determinations made by the access level determiner 449. For example, if a user requested a first property of a document, the user claims A and B would be compared against the ACL [claim A, claim B, and claim C] needed to access the first property. Because the user has access to at least claim A or Claim B, which is needed to access the first property, the property adding component 451 would grant access to the first property.

Example system 400 also includes a presentation component 420 that is generally responsible for presenting content and related information to a user, such as any information contained in the key-value store 427 that the user has access to. Such presentation may occur in response to the property adding component 451 ensuring that the user has access to one or more requested properties. Presentation component 420 may comprise one or more applications or services on a user device, across multiple user devices, or in the cloud. For example, in one embodiment, presentation component 420 manages the presentation of content to a user across multiple user devices associated with that user. Based on content logic, device features, associated logical hubs, inferred logical location of the user, and/or other user data, presentation component 420 may determine on which user device(s) content is presented, as well as the context of the presentation, such as how (or in what format and how much content, which can be dependent on the user device or context) it is presented and/or when it is presented. In some embodiments, the presentation component 420 is identical or similar to the presentation components 220 and/or 320.

In some embodiments, presentation component 420 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, the presentation component 420 generates structured data, tagged data or otherwise causes presentation of structured or tagged data that was previously unstructured, semi-structured, or untagged. For example, in some embodiments the presentation component 420 causes presentation of the key-value store 427, the contents of which may have been previously unstructured or otherwise been in a different form than the output provided by the presentation component 420. In this way, some embodiments convert input data to an output that is different than the input. For example, the inputs can be an entire resource herein and the output can be a single view of only a single property of the resource based on functionality performed by the property adding component 451.

Example system 400 also includes storage 425. Storage 425 generally stores information including data, data structures, computer instructions (e.g., software program instructions, routines, or services), and/or models (e.g., machine learning models) used in some embodiments of the technologies described herein. In an embodiment, storage 425 comprises a data store (or computer data memory). Further, although depicted as a single data store component, storage 425 may be embodied as one or more data stores or may be in the cloud. As described above, the storage 425 includes the key-value store 427.

Figure 5A:
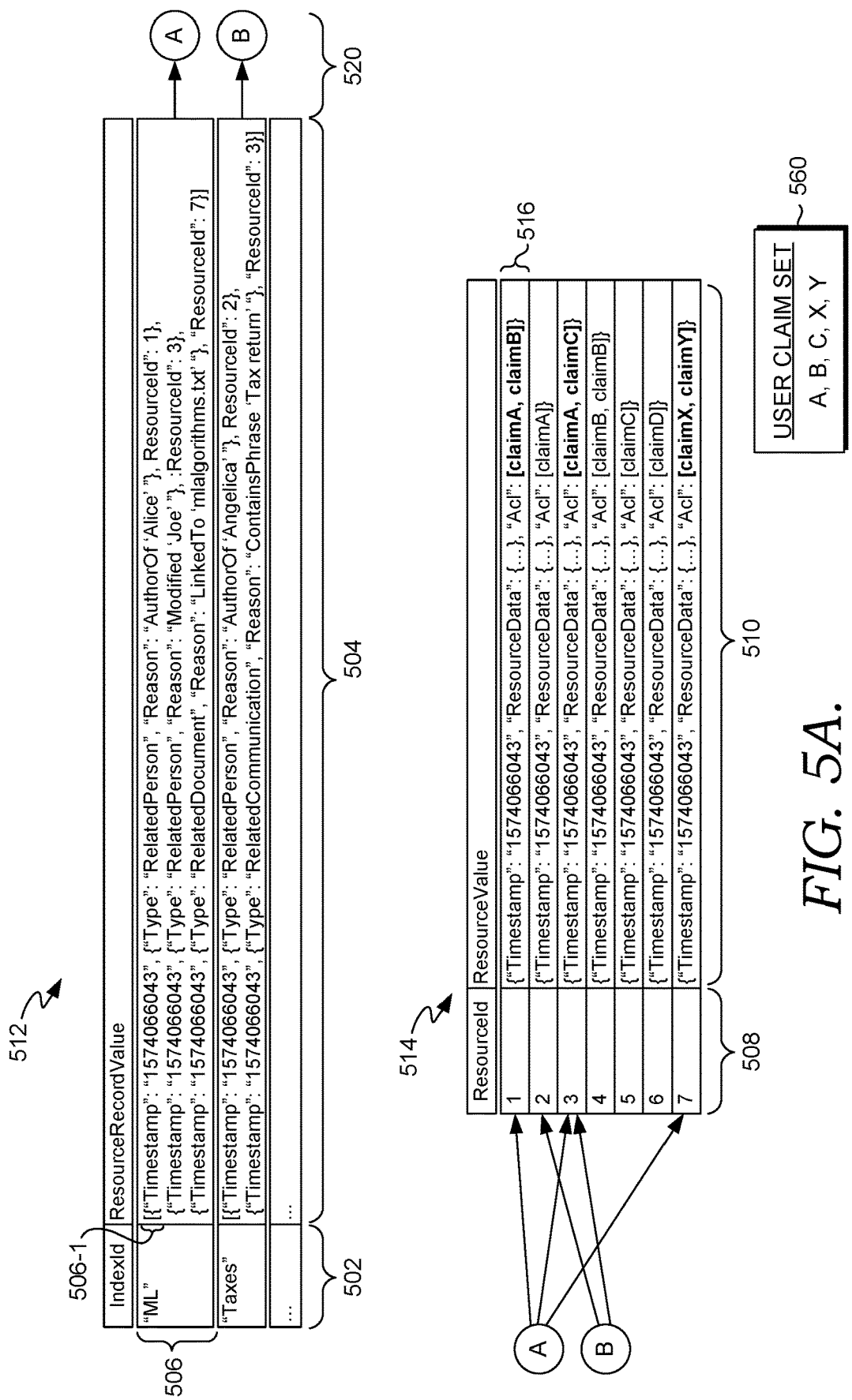
FIG. 5A is schematic diagram of an example index table and resource table illustrating that a user has access to each of the resources of a concept, according to some embodiments of this disclosure.

Turning now to FIG. 5A, a schematic diagram of an example index table 512 and resource table 514, illustrating that a user has access to each of the resources of the ML concept, according to some embodiments. In some embodiments, the index table 512 represents the index data structure 212 of FIG. 2 Likewise, in some embodiments, the resource table 514 represents the resource data structure 214 of FIG. 2.

The index table 512 is illustrated as key-value pairs where the key or index ID 502 indicates a given concept and the value 504 indicates the resource IDs (representing the resources that belong to or are a part of the given concept. The values 504 also indicate metadata (e.g., as generated by the relationships metadata generator 210) associated with particular resources, such as timestamps, the type of relationship, and the like. As illustrated in the index table 512, each concept is mapped to or associated with a plurality of resources for a single record or entry. For example, the record 506 indicates that the concept of ML is mapped to the resource IDs of 1, 3, and 7, meaning that resources 1, 3, and 7 are to be fetched or otherwise accessed to complete any request for the ML concept. Each resource ID also corresponds to a sub-record or sub-entry within the larger record. For example, the sub-entry 506-1 [{"Timestamp": "1574066043", {"Type": "Related Person", "Reason": AuthorOf 'Alice'}, "Resourceid": 1} is a sub-entry of the entry 506. In some embodiments, the "timestamp", "type," "RelatedPerson", "RelatedDocument," "RelatedCommunication", "Reason," and other metadata corresponds to the metadata described above with respect to the metadata generator 210.

The resource table 514 is also illustrated as key-value pairs where the key indicates the resource ID 508 and the value 510 indicates the content of the corresponding resource from the resource ID 508, ACLs needed to access the corresponding resource and other metadata. Each record or entry indicates a specific resource that is mapped to resource contents (e.g., payload of a resource), the specific ACL needed to access the specific resource, as well as metadata. For example, record 516 indicates resource ID 1 and its contents, and that claim A and/or claim B are needed to access the contents, as well as metadata (e.g., as generated by the metadata generator 210). In some embodiments, the index table 512 and/or the resource table 514 is presented or displayed to a computing device such that an administrator can view the information, such as the relationships, as well as modify information, such as mappings of concepts and resources. Alternatively, in some embodiments, the index table 512 and/or the resource table 514 are data structures to be accessed in the background and are not presented to administrators but are rather to be generated by programmers to execute requests.

FIG. 5A also illustrates the relationship between the index table 512 and the resource table 514 at runtime. For example, a user may issue a query or otherwise select a feature on a graphical user interface that includes the concept "ML" (i.e., "machine learning"). Responsively, some embodiments receive this request and locate the corresponding concept under the index ID 502, which is located in record 506. Responsively, some embodiments identify the resource IDs 1, 3, and 7 within the index data structure 512 and lookup each corresponding resource IDs under the resource ID column 508 of the resource table 514, as illustrated by the reference indicators 520 representing pointer values or other references. In this way, the index table 512 is a helper data structure that references entries within the resource table 214. As illustrated in FIG. 5A, each of the resources 1, 3, and 7 can be accessed by the requesting user, because the claim set of the user includes claims that are needed for the corresponding ACLs of each resource. As illustrated in the box 560, the user claim set includes claims A, B, C, X, and Y. That is, the requesting user may have claim A, claim B, Claim C, claim X, and claim Y. Because claim A and claim B of the user claim set match the ACL needed to access resource ID 1, this is accessible. Likewise, because claim A and claim B of the user claim set match the ACL needed to access resource ID 3, this resource is also accessible. And because claim X and claim Y of the user claim set matches the ACL needed to access resource ID 7, the user likewise has access to resource ID 7. Accordingly, the user in this example has access to each resource for the concept that the user has requested.

Figure 5B:
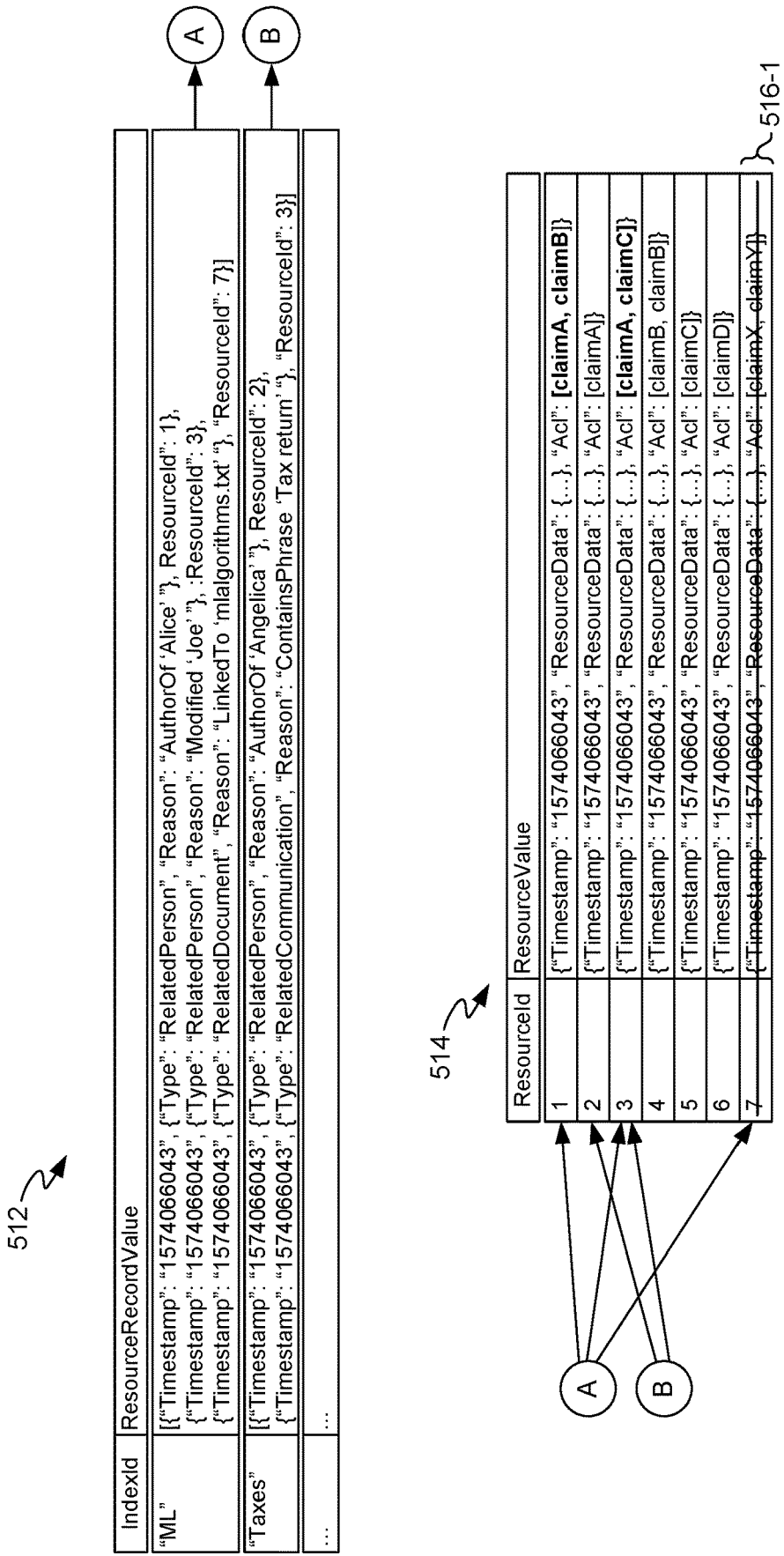
FIG. 5B is a schematic diagram of the index table and resource table of FIG. 5A, illustrating that a second user does not have access to each of the resources of the same concept, according to some embodiments.

FIG. 5B is a schematic diagram of the index table 512 and resource table 514 of FIG. 5A, illustrating that a second user does not have access to each of the resources of the ML concept, according to some embodiments. FIG. 5A and FIG. 5B illustrate that different users may be provided different information depending on their access credentials even though the same concept has been requested. Specifically, FIG. 5B illustrates that the second user does not have access to resource ID 7 but does have access to resource ID 3 and resource ID 1. In this way, the second user will be provided a composite view of the resources the second user has access to (e.g., resources 1 and 3), while other resources (e.g., resource 7) will not be provided, or will otherwise be encrypted or obfuscated as described above. In an illustrative example, the second user may have a claim set of claim A, claim B, and claim C (and not claim X and claim Y), as illustrated in the box 570. Accordingly, when particular embodiments compare this user claim set against the ACLs of the requested resources in the resource data structure 214, the second user will be provided resources 1 and 3 (because the user claims match all of the claims required in the corresponding ACLs), but not be provided resource 7 because none of the second user's user claims match any of the claims required for the resource ID 7 ACL (i.e., claim X and claim 7).

Figure 6:
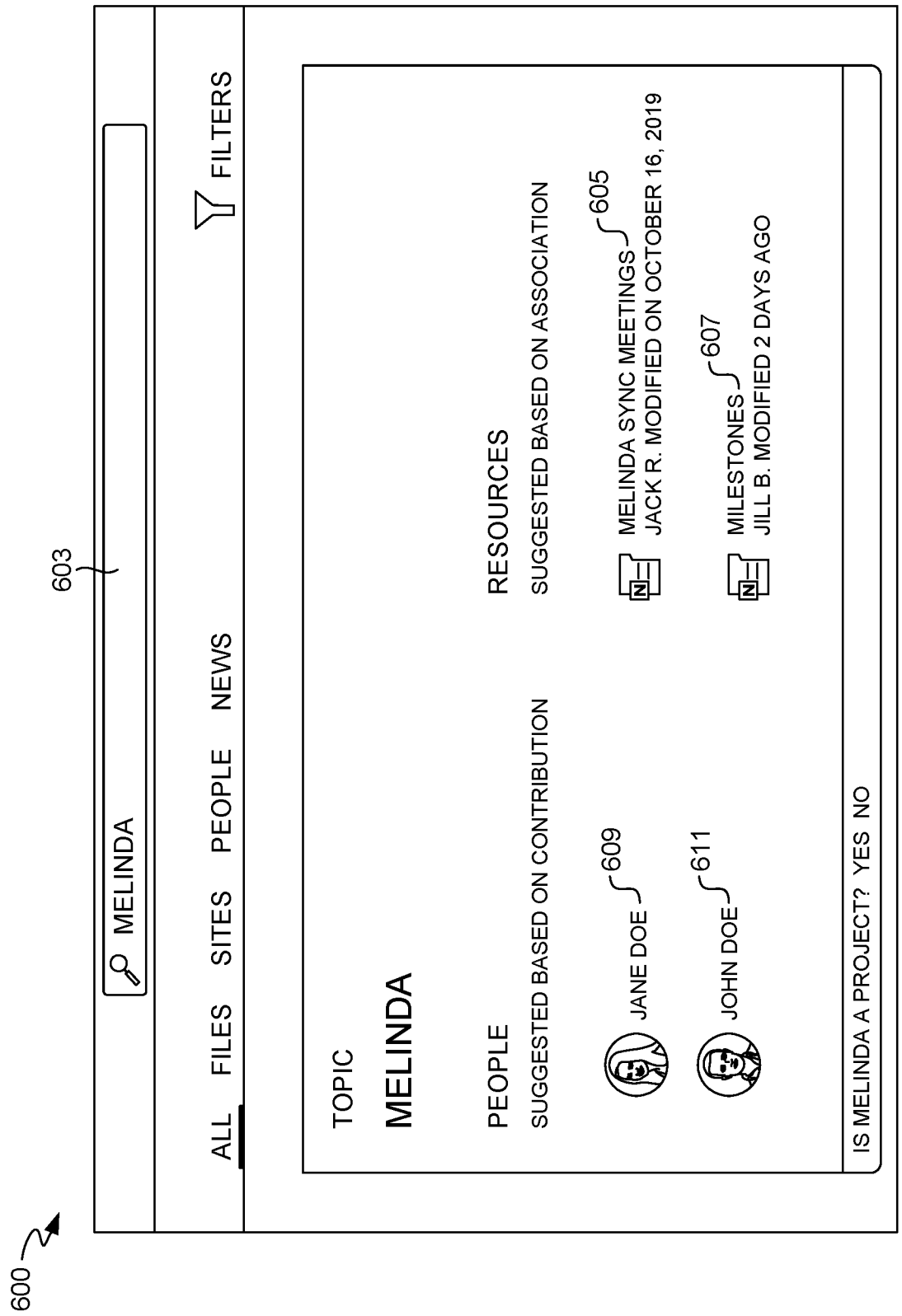
FIG. 6 is a screenshot of an example user interface, according to some embodiments of this disclosure.

Turning now to FIG. 6, in some embodiments, the screenshot 600 is provided by the presentation component 220 of FIG. 2 (and/or the presentation component 320/420 of FIG. 3 or 4). FIG. 6 represents what is input and surfaced back to the user at runtime, according to some embodiments. In some embodiments, the screenshot 600 represents the data that is displayed to any of the user devices 102.

As illustrated in FIG. 6, a user can issue the query "Melinda" in the search field 603 of a search engine. In some embodiments, a concept, such as "Melinda," represents a project, meeting topic, or other category of data. Accordingly, there may be one or more resources and information, such as documents and relationships, associated with the concept. In response to receiving this query, various embodiments identify "Melinda" as a concept and map it to one or more resources (e.g., via the concept-resource mapper 216), identify one or more relationships associated with the concept, (e.g., via the metadata generator 210), and/or determine whether the user has access to each of the resources based on the user claim set and corresponding ACLs (e.g., via the client-resource runtime evaluator 226). In response to such processing, certain embodiments provide the screenshot 600 of FIG. 6. For example, the resource indicators 605 and 607, which are document identifiers, are displayed in response to successful access control checking (e.g., via the client-resource runtime evaluator 226). Any selection of these indicators may open the corresponding document.

In some embodiments, although there may be more documents that belong to the "Melinda" concept, the user may not have access to these documents. For example, there may be another document entitled "finances" but because the user does not have access to this document, it is not displayed in the screenshot 600 of FIG. 6. In some embodiments, the people indicator 609 and 611 display indicators that represent different people associated with the "Melinda" concept. For example, the "Melinda" concept may be a meeting topic and various people may have been meeting invitees and/or attendees and those people may be displayed by the identifiers 609 and 611. In some embodiments, the displaying of the name identifiers 609 and 611 is determined via the relationship metadata generator 210, or as indicated in the metadata of FIG. 5A or 5B. For example, in the index table 512 for the concept of "Melinda," relationship type may indicate "related person," where the "reason" is that John Doe is a meeting attendee for the "Melinda" meeting. Responsively, this information is used to output "John Doe" (corresponding to identifier 611) under the "people" identifier of screenshot 600.

In some embodiments, the displaying of the document identifiers 605 and 607 (or any associated information, such as "Oct. 16, 2019") is determined via the metadata generator 210, or as indicated in the metadata of FIG. 5A or 5B. For example, in the index data structure 512 for the concept of "Melinda," relationship type may indicate "related document," where the "timestamp" indicates that Jack R. last updated the "Melinda sync meetings" document (corresponding to identifier 605) on Oct. 16, 2019. Responsively, this information is used to output "Jack R. modified on Oct. 16, 2019," under the identifier 605 of screenshot 600.

Figure 7:
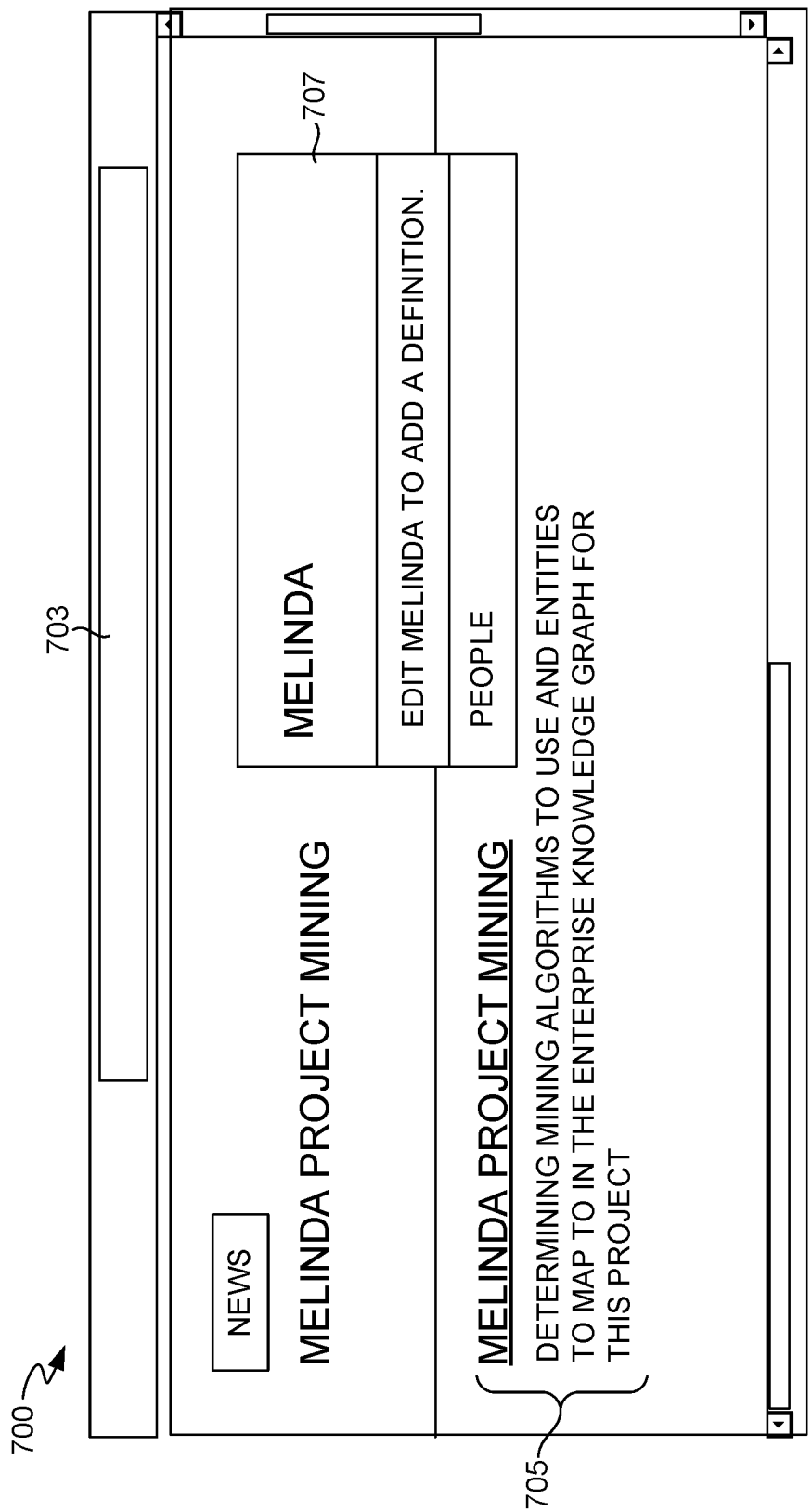
FIG. 7 is a screenshot of an example user interface, according to some embodiments of this disclosure.

Turning now to FIG. 7, a screenshot 700 of an example user interface is illustrated, according to some embodiments. In some embodiments, the screenshot 700 is provided by the presentation component 220 of FIG. 2 (and/or the presentation component 320/420 of FIG. 3 or 4). FIG. 7 represents what is surfaced to the user at runtime, according to some embodiments. In some embodiments, the screenshot 700 represents the data that is displayed to any of the user devices 102.

As illustrated in FIG. 7, a user can issue the query "Melinda" in the search field 703 of a search engine. In response to receiving this query, various embodiments identify "Melinda" as a concept and map it to one or more resources (e.g., via the concept-resource mapper 216), identify one or more relationships associated with the concept, (e.g., via the metadata generator 210), and/or determine whether the user has access to each of the resources based on the user claim set and corresponding ACLs (e.g., via the client-resource runtime evaluator 226). In response to such processing, certain embodiments provide the screenshot 700 of FIG. 7. For example, in response to this processing, some embodiments describe what Melinda refers to in the header 705, which is a "project mining" project (a hypothetical example for purposes of illustration). Some embodiments also allow users to edit any information associated with a concept, such as the resources that belong to it or any relationships (e.g., as generated by the metadata generator 210).

With respect to FIG. 7, the user interface element 707 (e.g., a popup window) allows a user modify the Melinda concept by adding or modifying a definition. For example, the user can add or edit what the Melinda concept refers to further clarify or indicate the parameters of the project. In some embodiments, this changes the header 705 and/or causes an update to the resources that are associated with the Melinda concept. For example, before the definition was edited, the "Melinda" concept definition may have simply been "project data mining," which elicited a first set of resources that, initially, did not include resources X, Y, and Z. However, a user may have subsequently changed the definition to say "Project data mining to mine resources X, Y, Z." Accordingly, the "Melinda" concept may then be mapped to the resources X, Y, and Z, and possibly other functionality. In some embodiments, the additional resources identified for inclusion (e.g., X, Y, and Z) may be determined based on using natural language processing techniques that parse and analyze the "resources X, Y, and Z" text strings. It is understood that although this example describes NLP techniques for identifying resources. Additional or alternative methods may be used. For example, as described above, a user can merely query a concept and the concept can be automatically mapped to several resource (e.g., as described above with respect to FIGS. 5A and 5B). Alternatively or additionally, contextual data (e.g., emails, texts, social media pages) or other external resources can be queried to determine resources that are associated with a particular concept associated with the contextual data. In an illustrative example, in response to modifying the concept definition, the concept-resource mapper 216, the resource entry generator 222, the index entry generator 224, the client-resource runtime evaluator, and/or the presentation component 220 may be updated to update the corresponding index data structures 212 and resource data structure 214, and execute the user query.

In some embodiments, the user interface element 707 allows a user to modify any other suitable data, such as relationship data (e.g., as generated by the metadata generator 210), resources, mappings, ACLs, and the like. For example, the user can edit the "people" associated with the Melinda concept. In some embodiments, this causes an update to the resources that are associated with the Melinda concept. For example, the "Melinda" concept definition may have only had 3 people initially associated with it. However, a user may have changed the people to add 2 additional people. Accordingly, some embodiments change the relationships and related information in the index data structure 212 and/or the resource data structure 214. In an illustrative example, in response to adding these 2 additional people, the concept-resource mapper 216, the resource entry generator 222, the index entry generator 224, the client-resource runtime evaluator, and/or the presentation component 220 may all be updated to update the corresponding index data structures 212 and resource data structure 214, and execute the user query.

FIG. 8 is a table 800 illustrating an aggregated ACL, according to some embodiments. In some embodiments, the table 800 represents the ACL aggregation data structure 312 of FIG. 3. In some embodiments, the table 800 represents the output as performed by the concept-resource mapper 316 and the ACL aggregator 318 of FIG. 3. For example, the concept-resource mapper 316 may map concept A to each of the resources 1, 2, 3, and 4. Further, the ACL aggregator 318 may aggregate or combine each of the ACLs required to access the resources 1, 2, 3, and 4, and removing any duplicate access control level identifiers (e.g., ACE_a may have been a duplicate needed to access both resources 1 and 4 and so one of the ACE_a indications may be deleted). As illustrated in FIG. 8, one or more of the access control level identifiers of: ACE_a, ACE_b, ACE_c, ACE_d, ACE_e, ACE_f, ACE_g, ACE_h, and ACE_i are needed by a user to access all resources of concept A. Likewise, one or more of the access control level identifiers of: ACE_j, ACE_m, ACE_n, and ACE_o are needed by a user to access all resources of concept B. In some embodiments, a user need only have a threshold quantity of claims or access credentials that match the aggregated ACL. This threshold may be less than the total amount indicated in the aggregated ACL or in certain embodiments, a user must have access credentials that match each access control level identifier for a given concept and set of resources. For example, in some embodiments, a user need only have claims ACE_a, ACE_b, and ACE_c to access the concept A and resources 1, 2, 3, and 4 (even though the user does not have access to each resource). Alternatively, the user may need to have claims ACE_a, b, c, d, e, f, g, h, and i to have access to concept A. Having "access" to a concept may mean to be able to view or otherwise have rendered each concept's associated resource as presented, for example, by the presentation component 310.

Figure 9:
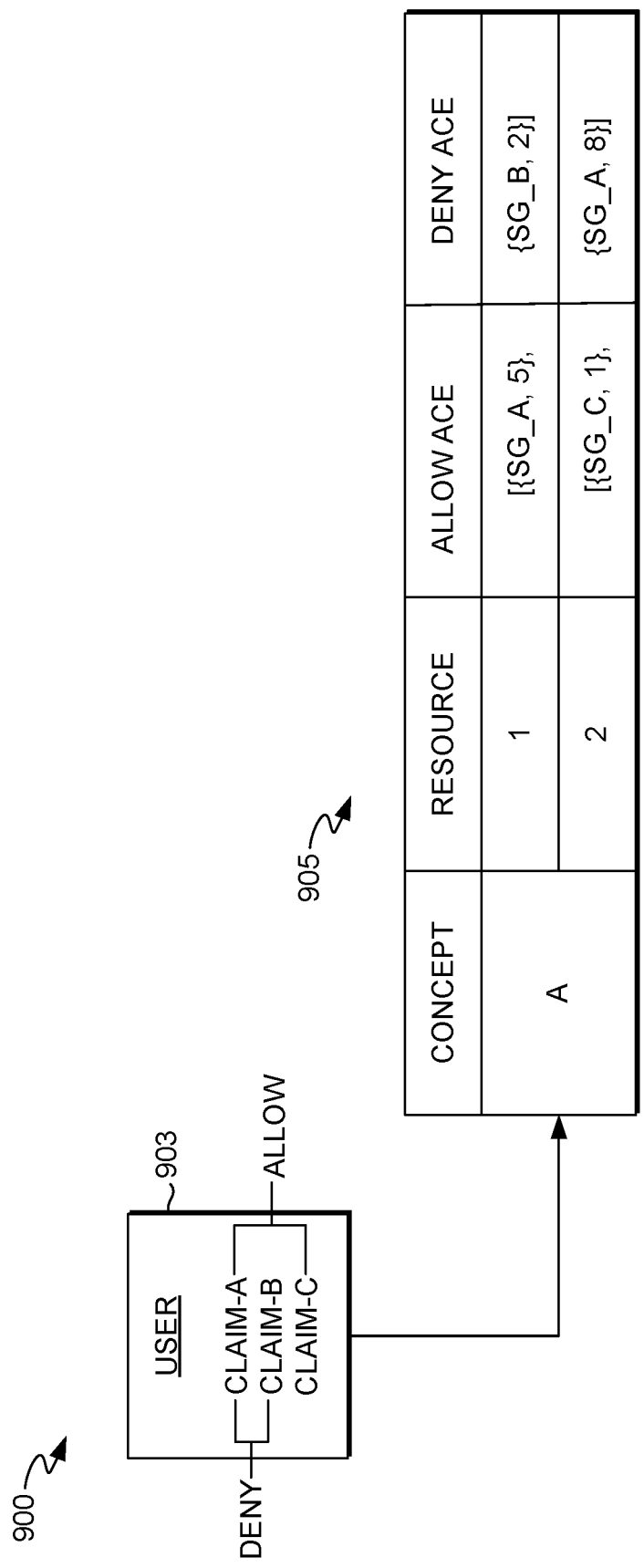
FIG. 9 is a schematic diagram illustrating an aggregated ACL and user access credentials that are compared against the aggregated ACL, according to some embodiments of this disclosure.

FIG. 9 is a schematic diagram 900 illustrating an aggregated ACL 905 and user claims 905 that are compared against the aggregated ACL 905, according to some embodiments. In some embodiments, the aggregated ACL 905 represents the ACL aggregation data structure 312 of FIG. 3. In some embodiments, the aggregated ACL 905 represents the output as performed by the concept-resource mapper 316, the ACL aggregator 318 of FIG. 3, the resource counter 320, and the user access determiner 322. FIG. 9 illustrates some embodiments where both allow ACEs and deny ACEs are used, which are indicative of particular resources that require particular access control levels ("allow ACEs") and particular resources that will be denied access to users if the users are members of particular access control levels ("deny ACEs").

Some embodiments count (e.g., by the resource counter 320) the number of allow and deny ACEs. Specifically, the aggregated ACL 905 indicates that SG_A (i.e., "security group A") is listed in 5 different resources for allow ACEs (i.e., 5 resources require SG_A access control level to have access) and that SG_B is listed in 2 different resources for deny ACEs (i.e., 2 resources will be denied access to a user if the user has SG_B access level credentials). The aggregated ACL 905 further indicates that SG_C is listed in 1 resource for allow ACEs and that SG_A is listed in 8 different resources for deny ACEs. These counts can be used to compare against the user claim set 903 to determine whether the user has access to concept A, which is described in more detail below.

Figure 10:
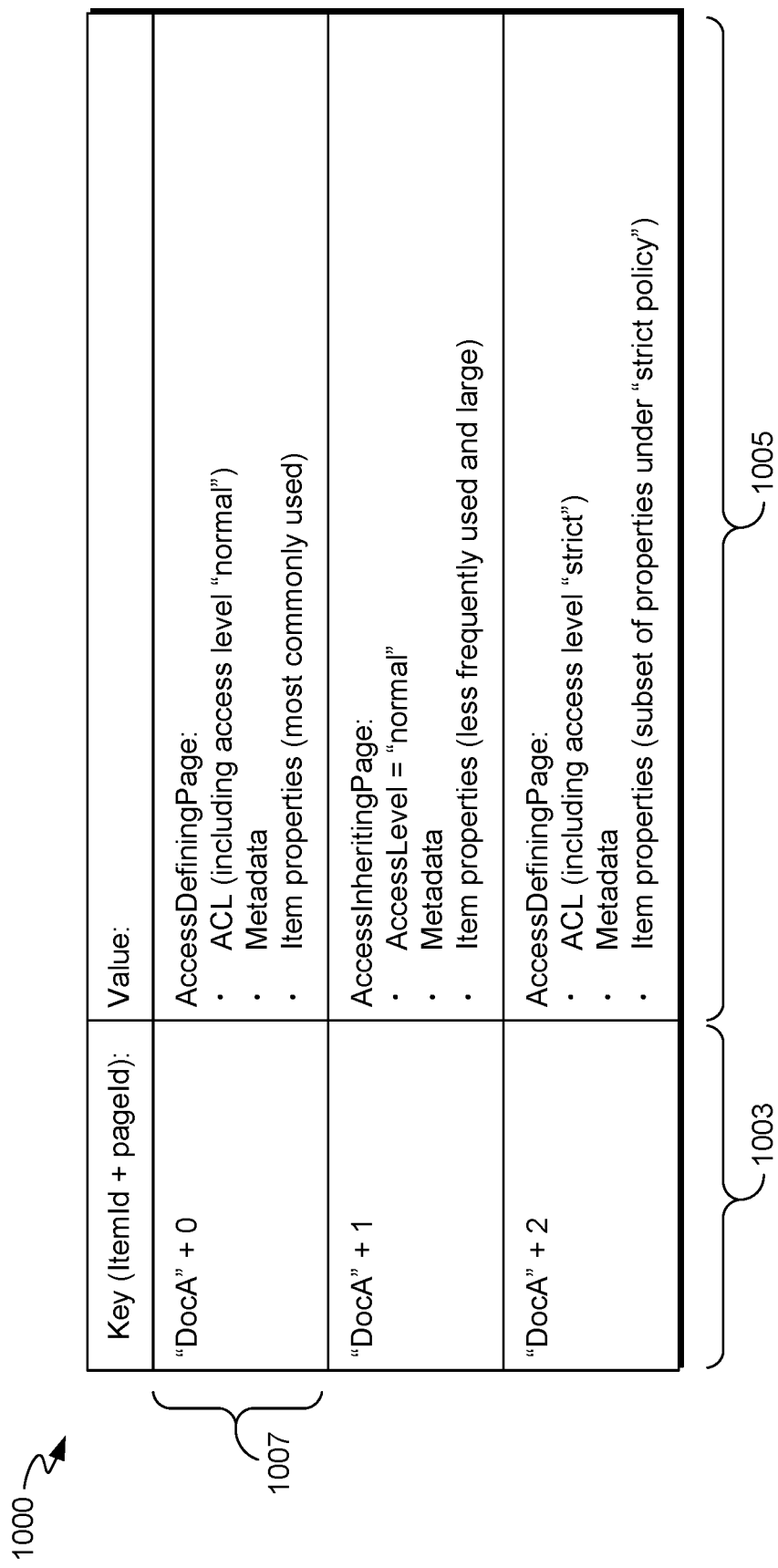
FIG. 10 is a schematic diagram of a key-value store that uses access defining memory storage units and access inheriting memory storage units to retrieve specific properties of resources, according to some embodiments of this disclosure.

FIG. 10 is a schematic diagram of a key-value store 1000 that uses access defining pages and access inheriting pages to retrieve specific properties of resources, according to some embodiments. In some embodiments, the key-value store represents the key-value store 427 of FIG. 4. In some embodiments, the data populated within the key-value store 1000 represents the data input by the property definition mapper 433, the access level mapper 435, and the runtime property inspector 437.

In some embodiments, access control management systems require access control credentials to access individual properties of a resource. This means that access to individual properties of a resource can be granted, while access to other individual properties of the same resource can be denied. FIG. 10 illustrates an embodiment to determine how access rights can be determined for one or more properties. The key attribute 1003 indicates the item ID (i.e., property ID) and the page ID where the contents of the property is located. The value attribute 1005 indicates for a given property: whether the page is an "access defining page" or an "access inheriting page," metadata, ACLs (or references to the ACLs on an access defining page if the page is an access inheriting page), and the contents of the properties. Each entry within the key-value store 1000 corresponds to a particular property of a given resource. For example, the entire key-value store 1000 may represent a document resource, and the entry 1007 may only represent a first property of three properties (e.g., a title of the document, a body of the document, or a particular set of data of the document). Accordingly, the entry 1007 indicates that property 0 is mapped to an access defining page, an ACL that includes the access level "normal," metadata, and item properties for the same record.

Figure 11:
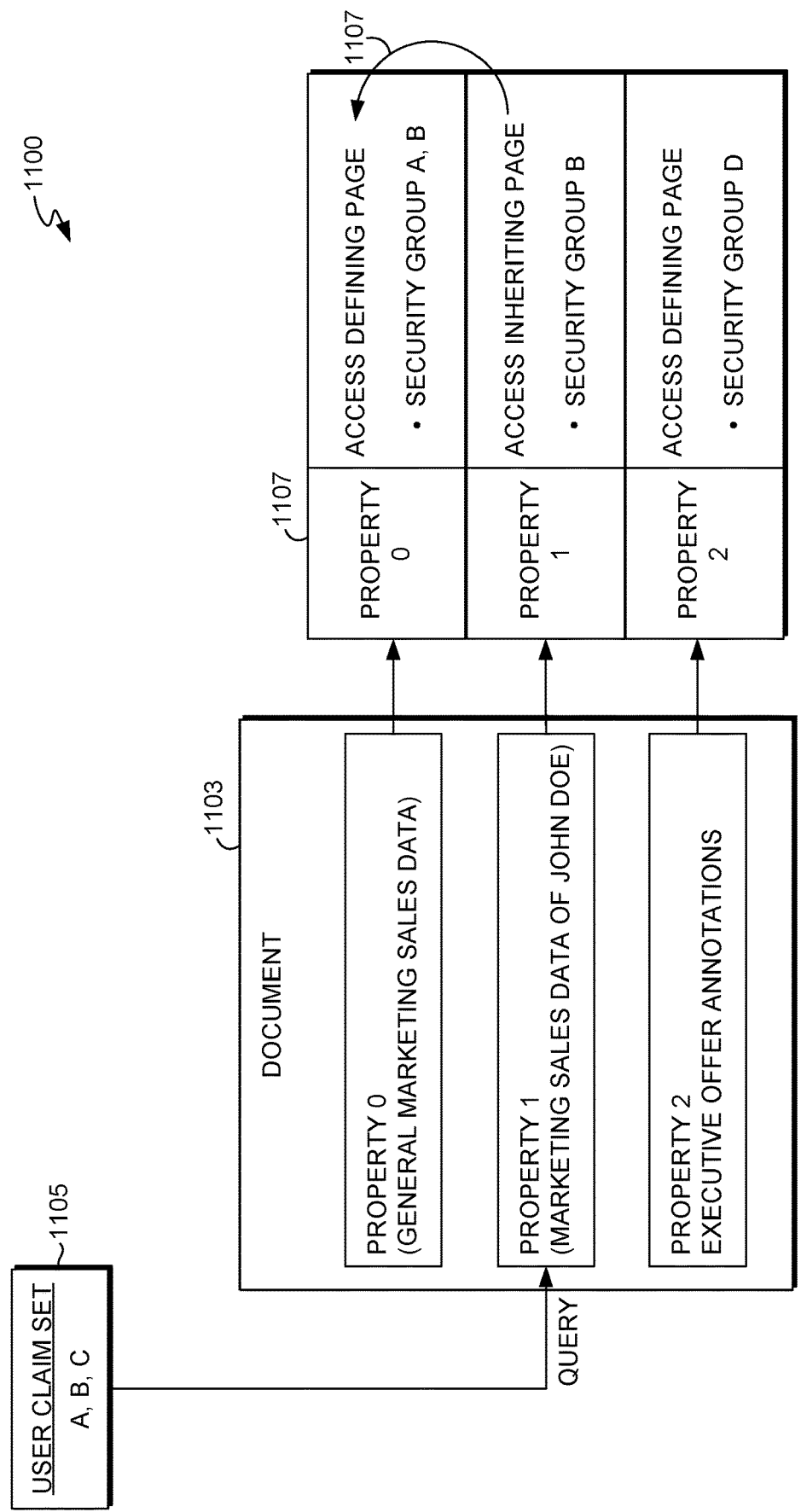
FIG. 11 is a schematic diagram that illustrates how particular properties of a resource are accessed given the user's access credentials, according to some embodiments of this disclosure.

FIG. 11 is a schematic diagram 1100 that illustrates how particular properties of a resource are accessed, given the user's access credentials, according to some embodiments. Specifically, the user, who has a claim set 1105 of A, B, and C, may be trying to access property 1 (marketing department sales data of John Doe) of the document 1103. In response to the request to access property 1, some embodiments locate (e.g., by the runtime property inspector 437) the corresponding property in the data structure 1107 (e.g., the key-value store 1000 of FIG. 10) and determine (e.g., by the run-time memory storage unit determiner 439) whether the page associated with the property level is an access defining page or an access inheriting page. Because property level 1 is an access inheriting page, certain embodiments read a pointer value or other reference indicator that points to the parent access defining page, which corresponds to the access defining page of property level 0. Some embodiments then compare the user claim set 1105 to the ACL, which is security group A, security group B. Because claim A matches security group A, and because claim B matches security group B, certain embodiments grant access to the contents of the access inheriting page of property 1. What this means is that in order to have access to the marketing department sales data of John Doe, users must have a claim set that is included in the ACL for general marketing sales data (i.e., they must also have access to the general marketing sales data). This is because property 1 is a child or species object of the larger class or parent property 0, as described above. Because the ACL of property 0 (i.e., security group A and security group B) is included in the user claim set 1105 (i.e., claim A and claim B), the user is granted access to the requested property level 1. In some embodiments, this functionality is performed in part by the runtime initialization component 445 and the runtime property object returner 447 as described with respect to FIG. 4.

Figure 12:
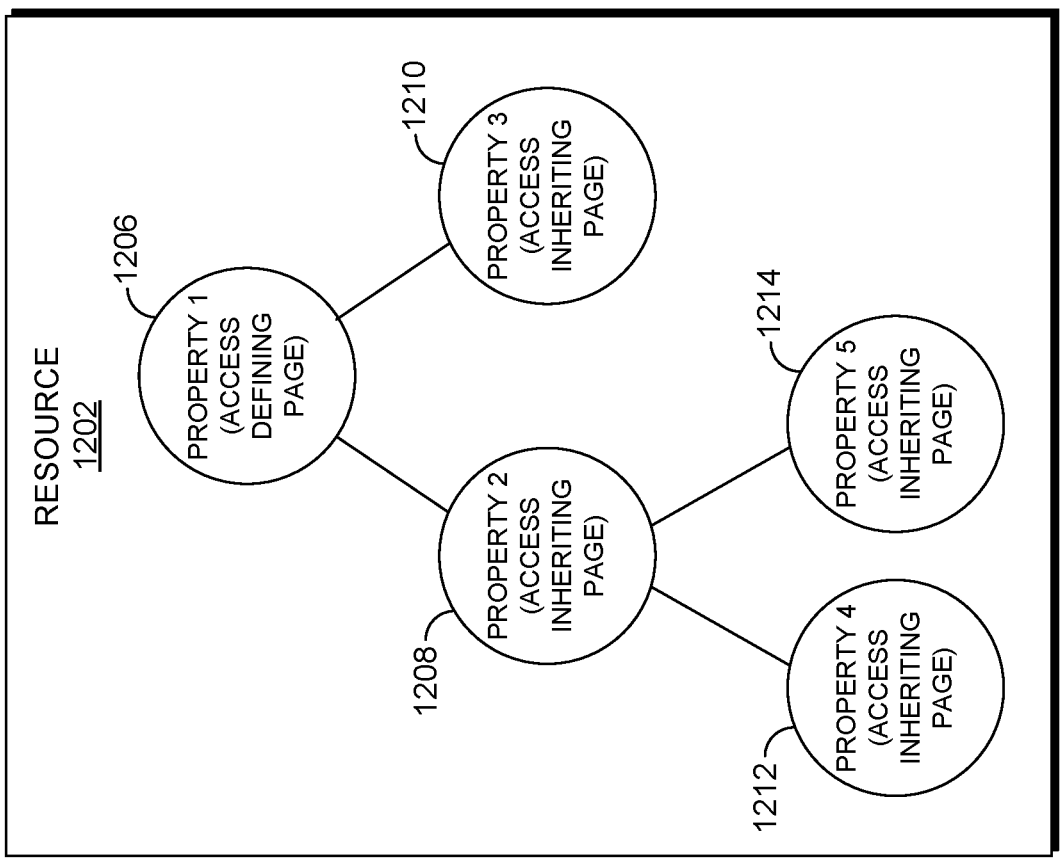
FIG. 12 is a schematic diagram that illustrates the access control level relationship between properties for a given resource, according to some embodiments of this disclosure.

FIG. 12 is a schematic diagram that illustrates the access control level relationship between properties for a given resource, according to some embodiments. In some embodiments, FIG. 12 represents the relationships between properties where there are access defining pages and access inheriting pages, as described in FIG. 4, FIG. 10, and FIG. 11. In some embodiments, the resources 1202 form a graph or tree structure where each property is represented by a node, and the edges represent the relationships between the nodes, such as whether the node is a child or parent node. The resource 1202 illustrates that the property 1 node 1206 (e.g., the root node) is the parent or genus of the entire class of child nodes 1208, 1210, 1212, and 1214. Accordingly, when the user requests access to any of the properties 2, 3, 4, and/or 5 (corresponding to nodes 1208, 1210, 1212, or 1214), in some embodiments the user must have the access credentials needed to access property 1 contents. Put another way, properties 2, 3, 4, and 5 are all represented by access inheriting pages, such that certain embodiments have a pointer value or other reference indicator that points to the property 1 access defining page (represented by node 1206). Likewise, in some embodiments, when the user requests access to property 1, the user is automatically granted access to all of property 1's children—i.e., 1208, 1210, 1212, and 1214.

Figure 13:
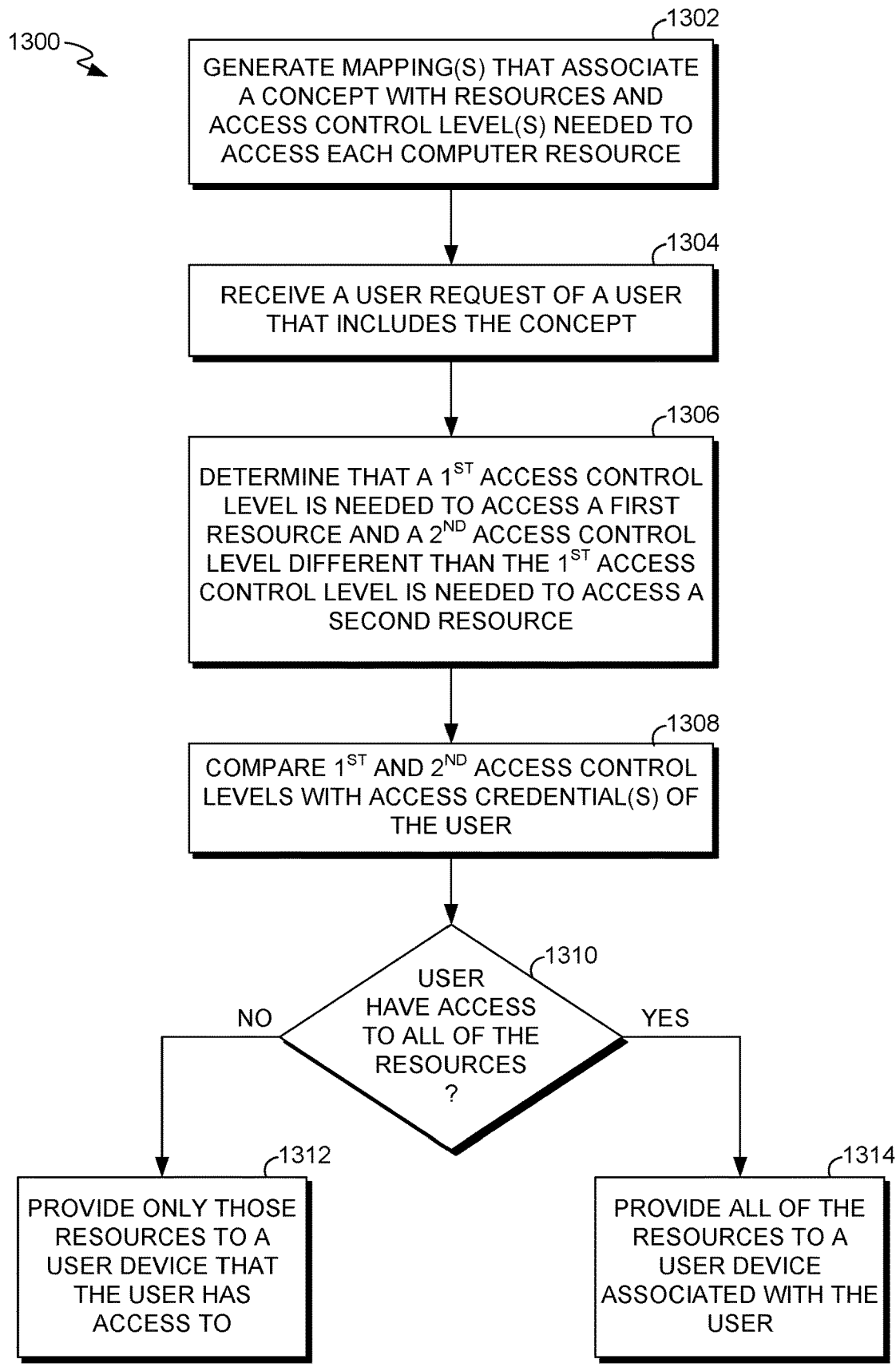
FIG. 13 depicts a process for providing access to one or more access controlled resources of a given concept, according to some embodiments of this disclosure.

Turning now to FIG. 13, which depicts a process 1300 for providing access to one or more access controlled resources of a given concept, according to some embodiments. Process 1300 (and/or any of the functionality described herein (e.g., processes 1400, 1500, 1600, 1700, 1800)) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes or any other functionality described herein.

Per block 1302 one or more mappings that associate a concept with a plurality of resources and one or more access control levels needed to access each computer resource are generated. A "mapping" may include one or more data structures that include populated data, which is associated by the mapping. In some embodiments, the one or more mappings are generated by the resource entry generator 222 and/or the index entry generator 224 as described with respect to FIG. 2. In some embodiments, the concept corresponds to a class of information and the plurality of computer resources correspond to information related to the concept. For example, the class of information may be a name, meeting topic, or project title, and the computer resources can be files, documents, websites, databases, and the like, which are associated with the concept. In an illustrative example, a concept may be a particular meeting, and the computer resources can be files, such as spreadsheets, presentation files, PDF documents, and the like that were or are to be discussed in the meeting or are otherwise associated with the meeting.

In some embodiments, the one or more mappings include a first data structure that maps the concept to a plurality of computer resource IDs corresponding to the plurality of computer resources. For example, the first data structure may be the index data structure 212 or 512 and its contents. In some embodiments, the one or more mappings include a second data structure that maps each computer resource ID of the plurality of computer resource IDs to a respective ACL. In these embodiments, the ACL includes one or more access control level identifiers that indicate one or more access control levels needed to access a respective computer resource. The first data structure may be an auxiliary data structure that references the second data structure in response to the receiving of the user request. For example, the second data structure may be the resource data structure 214 or 514 and its contents. In another example, the index table 512 is an auxiliary data structure to the resource table 514 of FIG. 5A.

In some embodiments, the one or more mappings further include generated metadata associated with each computer resource of the plurality of computer resources. For example, the metadata can be any metadata as described with respect to the relationship metadata generator 210. In some embodiments, the metadata includes information describing how the concept is associated with the plurality of resources. For example, the metadata can include a timestamp indicating when a concept of each computer resource was associated with each computer resource and a relationship type indicating how the concept is associated with each computer resource. For example, the relationship type can be "related person," "related document," and/or "related communication" as indicated via discussion of the metadata generator 210 or the metadata indicated in the index table 512 or resource table 514 of FIG. 5A.

In some embodiments, the one or more mappings include a first data structure that includes a mapping of a plurality of concept to computer resource IDs such that each concept of the plurality of concepts is mapped to a plurality of computer resource IDs as a single entry within the first data structure. For example, the index table 512 describes this, such as the entry 506 that indicates the ML concept is mapped to resource IDs 1, 3, and 7 as a single entry.

In some embodiments, the one or more mappings include a second data structure that includes a mapping from the plurality of computer resource IDs to respective access control lists (ACL) such that each computer resource ID is mapped to a particular ACL. In these embodiments, the ACL indicates one or more access control levels required to access a particular resource associated with the computer resource ID. For example, the resources table 514 describes this. Specifically, for example, for entry 515, computer resource ID 1 is mapped to the ACL [claimA, claimB], indicating that one or two access levels are needed to access resource 1's contents.

In some embodiments, the one or more mappings include a first data structure that is a key-value data structure and each concept of the plurality of concepts represents a key, and each key references a set of values corresponding to a respective computer resource ID. The first data structure may be an auxiliary data structure where each requested concept references one or more corresponding keys of the second data structure that represents one or more resources that the user has requested. For example, this first data structure may be the index data structure 212 of FIG. 2 or the index table 512 of FIG. 5. For instance, in the index table 512, one key is the "ML" identifier and the values for that entry (entry 506) include resource 1, 7, 3, and metadata.

In some embodiments, the one or more mappings include a second data structure that is a key-value data structure indicating that each resource ID of the plurality of resource IDs is a key, and each key references a set of values corresponding to the particular ACL needed to access a corresponding resource associated with the resource ID. For example, the second data structure may be the resource data structure 214 of FIG. 2 or the resource table 514 of FIG. 5. For instance, for entry 516, a key may be the resource ID of 1, which references ACL values [ClaimA, ClaimB] and metadata.

Per block 1304, a user request that includes the concept is received. In some embodiments, the client-resource runtime evaluator 226 performs block 1304 as described with respect to FIG. 2. The user request may be associated with a user. For example, the user, using a user device, may open a client application (e.g., a web browser) and generate or otherwise access a URL, which directs the user to a web application. The user may then input a query for the concept, as described, for example with respect to inputting the concept "Melinda" within the search field 703 or 603 of FIGS. 7 and 6 respectively. In another example, the user may input a different query (e.g., "data mining") that does not directly match the concept, but the different query may be mapped (e.g., via any suitable query execution technique, such as TF-IDF, Word2vec, or the like) to the concept in the background. In some embodiments, the query need not only be directed to the concept, but one or more other concepts or terms as well. For example, using the illustration above, the query may be "Project Rox and Project Melinda and emails related thereto." In this string, there may only be one concept, such as "Melinda" or multiple concepts, such as "Melinda" and "Rox." In some embodiments, the query can be for one or more resources associated with the concept, as opposed to directly inputting the concept itself.

Per block 1306, it is determined that a first access control level is needed to access a first computer resource and a second access control level different than the first access control level is needed to access a second computer resource. In some embodiments, functionality as described with respect to the client-resource runtime evaluator 226 performs block 1306. In an illustrative example of block 1306, some embodiments can determine, using the resource table 514 (and/or the index table 512), that Claim A and/or Claim B are needed to access resource 1, whereas Claim X and/or Claim Y are needed to access resource 7, which correspond to different access control levels needed to access the corresponding resources. In an illustration of how block 1306 can occur, the following example is given. Some embodiments can first receive a request (e.g., block 1304) for a first concept of the plurality of concepts where the request is associated with a first user. In response to the receiving of the request, particular embodiments locate the first concept in the first data structure (e.g., the index data structure 212) and associate, via the first data structure, the first concept to a first plurality of computer resource IDs corresponding to a plurality of computer resources that are associated with the first concept (e.g., as indicated in entry 506 of FIG. 5A). In response to the associating, some embodiments map, via a second data structure (e.g., the resource data structure 214 of FIG. 2), each computer resource ID of the first plurality of computer resource IDs to a respective ACL (e.g., as indicated within the entry 516 of FIG. 5A). In this way, when this is repeated for two or more resources, some embodiments can determine that they require different ACLs based on these mappings.

Per block 1308 the first and second access control levels are compared with one or more access credentials of the user. In some embodiments, this is performed by the functionality described with respect to the client-resource runtime evaluator 226 of FIG. 2. For example, the comparing can be similar to how the user claim set 903 of Claim A, Claim B, and Claim C is compared against the ACLs within the data structure 905 of FIG. 9 or how the user claim set 1105 of A, B, and C are compared against the ACLs within the document 1103 of FIG. 11. In an illustration using the example above with respect to block 1306, in response to the mapping (via the second data structure), some embodiments determine whether the first user's access credentials are included in the respective ACL for each computer resource ID of the first plurality of computer resource IDs. For example, referring back to FIG. 5A, to access resource 1, it is determined whether the first user has [ClaimA, ClaimB], since those are the claims required to access resource 1, as indicated in the entry 516 of FIG. 5A.

Per block 1310, it is determined whether the user has access to all of the resources. In some embodiments, this is performed by the functionality described with respect to the client-resource runtime evaluator 226 of FIG. 2. In some embodiments, block 1310 is performed based on the comparing of block 1308.

Per block 1312, if the user does not have access to all of the resources, particular embodiments provide to a user device only those resources that the user has access to. In some embodiments, this is performed by the functionality as described with respect to the presentation component 220 of FIG. 2. For example, in some examples, a user is denied access to the second computer resource based at least in part on the comparing. Accordingly, the second computer resource is not surfaced to the user or is otherwise obfuscated. In another example illustration of block 1312, based at least in part on determining whether the first user's access credentials are included in the respective ACL, certain embodiments determine that the first user has access to a first computer resource of the plurality of computer resources and does not have access to a second computer resource of the plurality of computer resources. Accordingly, based at least in part on determining that the first user has access to the first computer resources and not the second computer resources, the user device associated with the first user is provided only the first computer resource (and not the second computer resource).

Per block 1314, if the user does have access to all of the resources, some embodiments provide all of the resources to a user device associated with the user. In some embodiments, this is performed by the functionality as described with respect to the presentation component 220 of FIG. 2. In some embodiments, based on the determining (block 1306) and the comparing (block 1308), at least the first computer resource is provided to user devices associated with the user. For example, referring back to FIG. 6, the resource indicators 609, 605, 607, and 611 can all be provided to the user since the user has access to each of them as indicated on the screenshot 600.

In some embodiments, the process 1300 may include additional or alternative functionality. An example of alternative functionality is described, for example, with respect to FIG. 3. An example of additional functionality includes executing a query of another user but for the same concept. In these embodiments, this other user may have a completely different user experience or resources surfaced based on his or her access credentials. For example, some embodiments receive a user request associated with a second user, wherein the second request includes the same concept as indicated in block 1304. Using the same generated one or more mapping described with respect to block 1302, some embodiments can determine that the second user has access to the second computer resource but not the first computer resource. This determination can be identical to the determination described with respect to block 1308. In some embodiments, this determination is performed by the client-resource runtime evaluator 226 and uses all the functionality described with respect to FIG. 2. Based at least in part on this determination, some embodiments provide the second computer resource to another user device associated with the second user. For example, referring back to FIG. 6, instead of surfacing all of the resource indicators 609, 611, 605, and 607 back to the user as illustrated in the screenshot 600, less than all of these references are surfaced back to the second user, such as only resource indicator 609 (and not 611, 605, or 607). In this way, even though a same concept (e.g., "Melinda") is queried by different users, because user's access credentials may be different, the resources (and other relationship information) that are rendered back to the respective user is different.

In some embodiments, block 1314 (and/or block 312) additionally includes providing relationships and other data as generated by the metadata generator 210 for the resources the user has access to. For example, the return data may indicate the timestamp, the related person type, related document type, and other information described with respect to the metadata generator 210.

Figure 14:
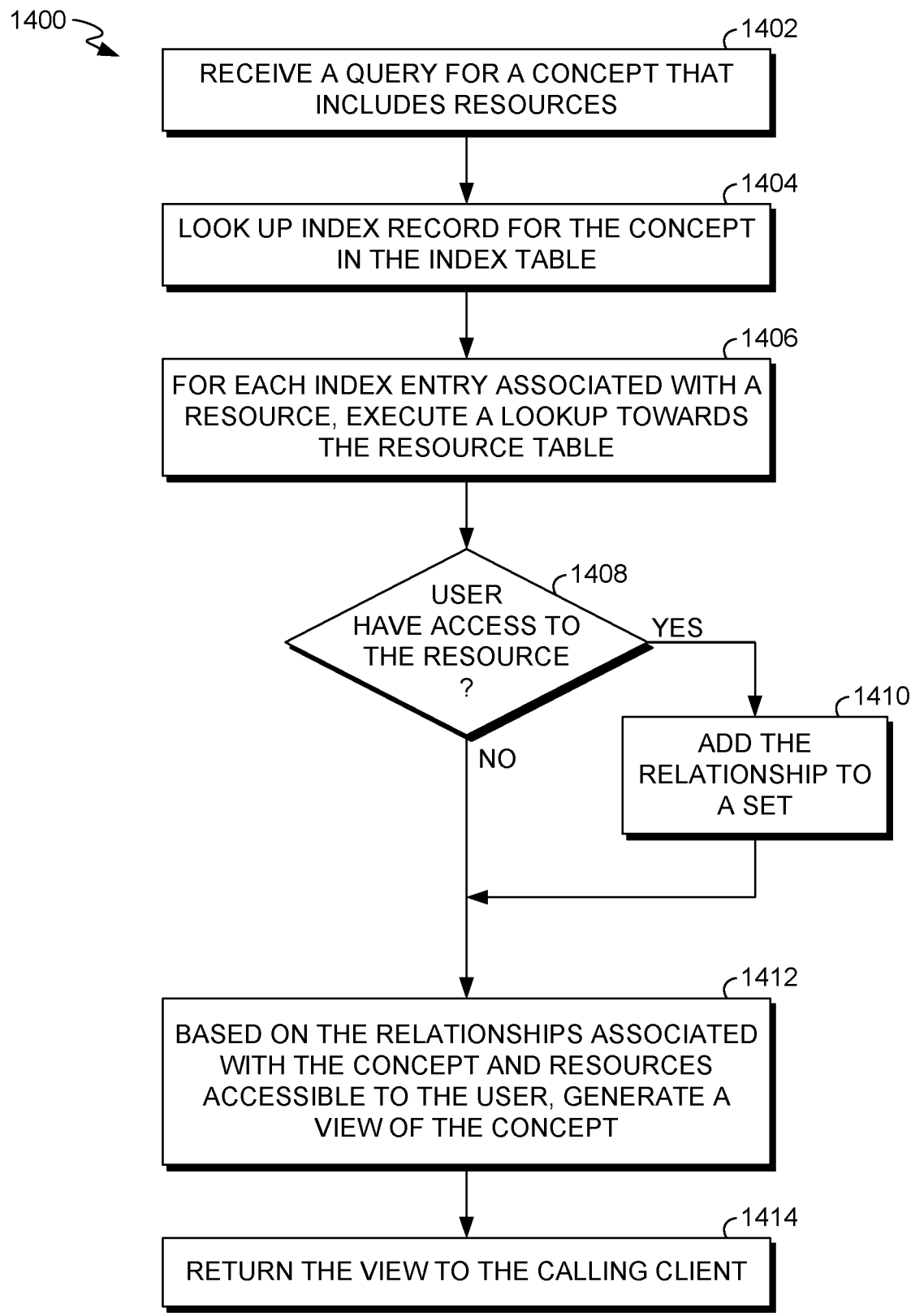
FIG. 14 is a flow diagram of an example process for returning a view to a calling client, according to some embodiments of this disclosure.

FIG. 14 is a flow diagram of an example process 1400 for returning a view to a client, according to some embodiments. In some embodiments, the process 1400 is performed by the client-resource runtime evaluator 226 of FIG. 2. In some embodiments, the process 1400 represents the functionality that can occur by blocks 1304 through 1314 of FIG. 13. In some embodiments, as soon as an index table (e.g., 512) and a resource table (e.g., 514) is generated with associated mappings, runtime functionality can occur. Using the indexes in the index table and the access-controlled resources in the resource table, an API/interface may be created and utilized for executing queries on behalf of a user, where the result is a synthesized composite view of a concept. The information returned may vary across users based on which resources are accessible to them. In some embodiments, such AP/interface can be: View GetConceptView(ConceptIdentifier conceptID, Claimset userClaimSet).

Per block 1402, some embodiments receive a query for a concept that includes resources. For example, a user can query the concept "ML," which included the resources 1, 3, and 7 as indicated in FIG. 5B. In some embodiments, block 1402 is identical or similar to block 1304 of FIG. 13. Per block 1404, some embodiments look up an index record for the concept in the index table. For example, using the illustration above, some embodiments look up the entry 506 corresponding to the ML concept.

Per block 1406, for each index entry associated with a resource, particular embodiments execute a lookup of the resource table. In other words, each index entry corresponding to each resource of the resources is iterated. Such lookup can occur sequentially or in parallel using the resource table identifier found in the entry and the user claim set. For example, referring back to FIG. 5A, the index entry 506-1 (corresponding to resource ID 1), as well as the other index entries corresponding to resource IDs 3 and 7, can be located in the resource table 514.

Per block 1408, it is determined whether the user has access to the resource corresponding to the index entry. In some embodiments, this functionality is identical to that described with reference to block 1308 and 1310 of FIG. 13. Per block 140, if the user has access to the resource, a relationship associated with the resource is added to a set for later processing. This relationship can be any relationship data described, for example, with respect to the relationship metadata generator 210 of FIG. 2. For example, referring back to FIG. 5B, because the user has access to resource IDs 1 and 3, the associated relationships can be stored, such as a timestamp, resource data, the related person(s), and reason data.

Per block 1412, based on the relationships associated with the concept and resources available to the user, a view of the concept is generated. Depending on the desired user experience, this could involve processing or structuring the data in some way. For example, embodiments can generate a property bag containing the relationships. In an illustrative example, referring back to FIG. 5B, if a user issuing the query has claim A, claim B, and claim C access credentials and queries for the concept "ML," and there are no constraints on relationship type, the user can be provided a composite view of resources 1 and 3, but not 7 because the user does not have access to resource 7. That is, the user claim set does not include both the claims X and Y. Accordingly, the returned data in this instance can be as follows: {"Concept": "ML", "NumRelationships": 2, "Relationships": [{"Type": "RelatedPerson", "Reason": "Author of 'Alice'"}, {"Type": "RelatedPerson", "Reason": "Modified 'Joe'"}]. This indicates that for the concept of ML, there are 2 relationships that can be returned (corresponding to resource IDs 1 and 3), with specific types of relationships and reasons.

Per block 1414, the view is returned to the calling client. For example, each resource that the user has access to, as well as the relationships or metadata associated with each of those resources, can be provided to a user device such as via a user interface identical or similar to FIG. 6. In some embodiments, the interface could be further extended by including a parameter listing the type(s) of relationship(s) that should be considered. Depending on how the index table is populated, this may impact the process 1400. For example, block 1404 can be altered to generate index table keys by combining the concept identifier with the relationship type if separate records are used per concept (e.g., one for each concept-relationship pair). Block 1406 may also be altered to check whether the relationship type of each index entry matches the provided parameter, skipping any index entry where it does not match prior to checking whether the user has access.

Figure 15:
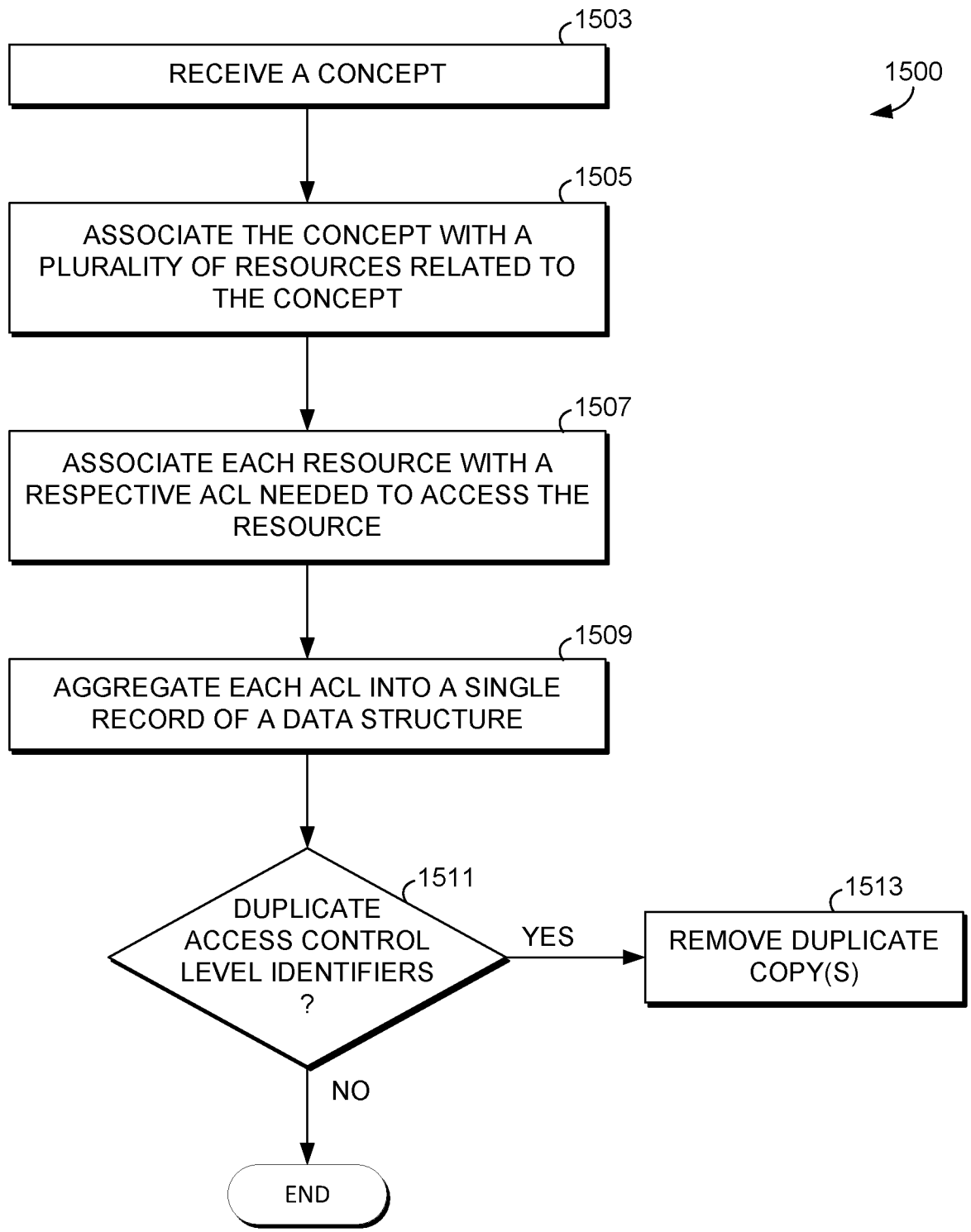
FIG. 15 is a flow diagram of an example process for generating an aggregate ACL, according to some embodiments of this disclosure.

Turning now to FIG. 15, a flow diagram of an example process 1500 for generating an aggregate ACL is illustrated, according to some embodiments. Per block 1503, a concept is received (e.g., by the concept-resource mapper 1306). Per block 1505, the concept is associated with a plurality of resources related to the concept. For example, the concept-resource mapper 216 can map a concept to a plurality of resources, as described with respect to FIG. 2. Per block 1507, each resource of the plurality of resources is also associated with a respective ACL needed to access the resource. For example, the concept-resource mapper 316 as described with respect to FIG. 3 can determine that each resource of the plurality of resources requires user access credentials to include one or more access control levels needed to access the corresponding resource. For instance, a first resource may require a first ACL, which consists of access levels A, B, and C to access its contents, whereas a second resource may require a second ACL, which consists of access levels C, D, and E to access its contents.

Per block 1509, each ACL is aggregated into a single record of a data structure. In some embodiments, this includes the functionality as described with respect to the ACL aggregator 318 of FIG. 3. Using the illustration above, for example, the first and second ACLs may be combined to formulate the following aggregated ACL: [A, B, C, C, D, E] as a single entry. An example single entry is described with respect to FIG. 8. For example, the table 800 includes a single entry that includes the concept A, resources 1, 2, 3, and 4, and the aggregated ACL [ACE_a through ACE_i].

Per block 1509, it is determined (e.g., by the dedup component 330) whether there are any duplicate access control level identifiers. In some embodiments, this additionally includes the functionality as described with respect to the dedup component 330 of FIG. 3. Per block 1513, if there are duplicate access control level identifiers, a set of embodiments remove (e.g., as described with respect to the dedup component 330) the duplicate copies. In this way, some embodiments generate an aggregated ACL data structure mapping such that the generating of the aggregated ACL data structure mapping aggregates a plurality of different ACLs associated with different computer resources of a first concept into a single record and removes duplicate access control level identifiers of the ACL. For example, using the illustration above, the aggregated ACL of [A, B, C, C, D, E], a set of embodiments may remove a "C" access level control identifier, which is a copy of the duplicate such that the new aggregated ACL is as follows: [A, B, C, D, E]. In this way there are no duplicates and computing resource consumption can be reduced, as described above. In some embodiments, the output or final result of the process 1500 is the ACL aggregation data structure 312 as described with respect to FIG. 3.

In some embodiments, the process 1500 represents offline or build time functionality that is performed in preparation to execute runtime requests. In this manner, in some embodiments, the process 1500 includes additional functionality to process a runtime query using the new aggregated ACL. For example, in some embodiments, in response to a user query for a concept, A, some embodiments lookup concept A within the table 800 to determine what the new aggregated ACL is required to access concept A. Particular embodiments, may responsively compare the user claim set to determine if the user has individual claims that match a threshold quantity (e.g., all or a majority) of access control level identifiers within the aggregated ACL. Responsively, if the threshold is met, particular embodiments grant access to the concept (or in some cases, those resources of the concept that the user has access to). In some embodiments, the additional runtime functionality can include that as described with respect to the reference counter 320, the user access determiner 322, and/or the presentation component 310 of FIG. 3.

Figure 16:
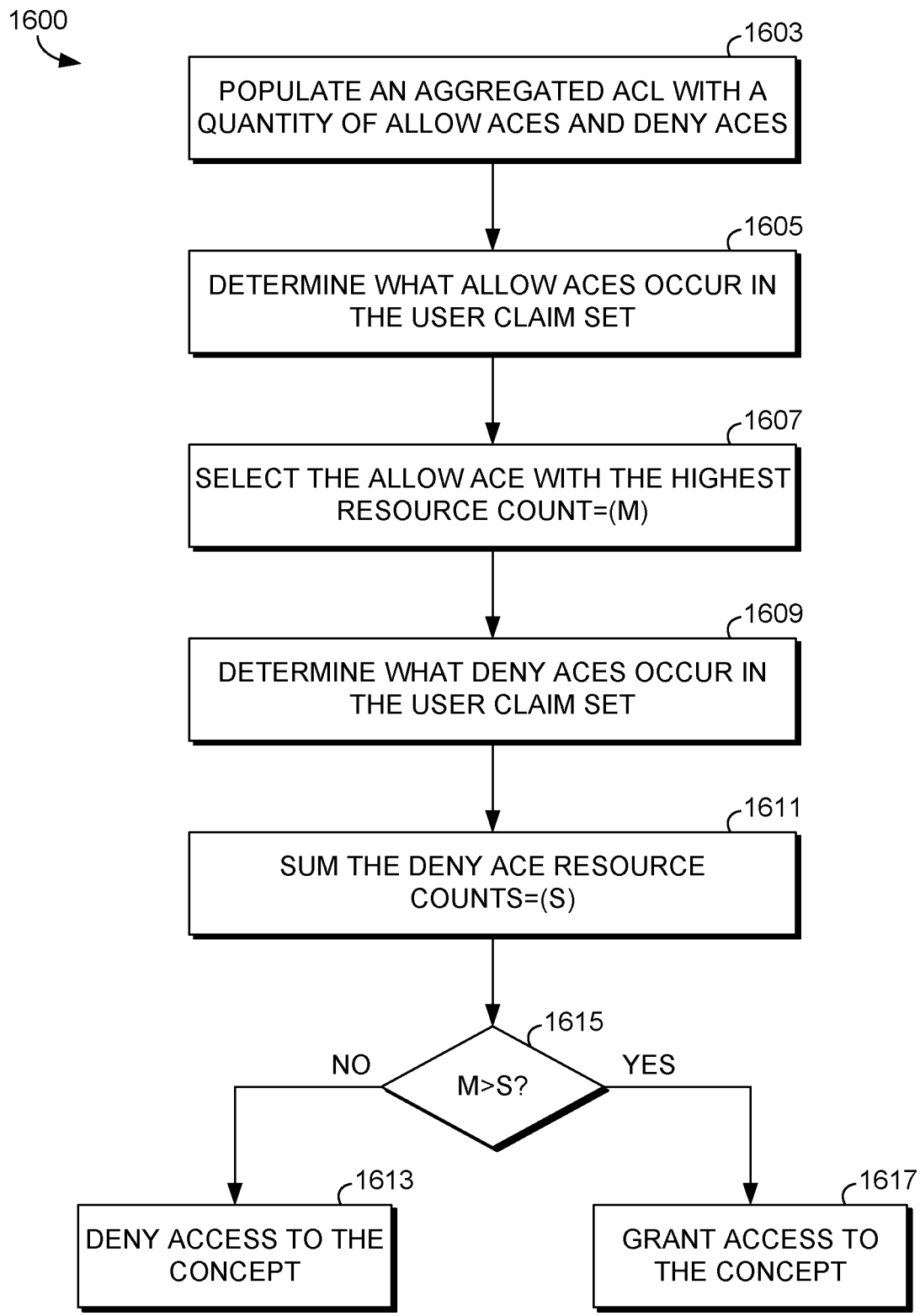
FIG. 16 is a flow diagram of an example process for determining whether to grant access to a concept based on using an aggregated ACL, according to some embodiments of this disclosure.

Turning now to FIG. 16, a flow diagram of an example process 1600 for determining whether to grant access to a concept based on using an aggregated ACL is illustrated, according to some embodiments. In some embodiments, the process 1600 occurs after the process 1500 of FIG. 15 occurs. In some embodiments, blocks 1605, 1607, 1609, 1611, 1613, 1615, and 1617 represent runtime functionality such that an aggregated ACL data structure mapping has already been generated and is used to execute a query (e.g., lookup, locate, validate, return concept), for example.

Per block 1603, some embodiments populate an aggregated ACL with a quantity of allow ACEs and deny ACEs. In some embodiments, such population is described with respect to the resource counter 320 of FIG. 3. In an illustrative example, referring back to FIG. 9, the table 905 illustrates the quantity of allow ACEs and deny ACEs. For instance, for resource 1, SG_A, 5 represents 5 allow ACEs, and SG_B represents 2 deny ACEs. This indicates that 5 resources require SG_A membership to access its contents, whereas 2 resources will not grant access to any users if they are members of SG_B.

Per block 1605, it is determined what allow ACEs occur in the user claim set. In some embodiments, this includes the functionality described with respect to the Allow ACE component 324 of FIG. 3. In an illustrative example, referring back to FIG. 9, the user claim set 903 is compared against the allow ACEs in the table 905 and it is determined that allow ACEs SG_A and SG_C (corresponding to claim A and claim C) occur in the user claim set 903. That is, two of the user claims A and C match these ACEs.

Per block 1607, some embodiments select the allow ACE with the highest resource count, which is represented by M. In some embodiments, this is performed by the allow ACE component 324 of FIG. 3. For example, referring back to FIG. 9, embodiments select SG_A because it has the highest resource count, which is 5 and 5 is equal to M. Put another way, 5 is greater than 1, which corresponds to the allow ACE SG_C, 1, and so the other ACE SG_A is selected and its corresponding resource count.

Per block 1609, a set of embodiments determine what deny ACEs occur in the user claim set. In some embodiments, this is described with respect to the deny ACE component 326 of FIG. 3. In an illustrative example, referring back to FIG. 9, the user claim set 903 is compared against the deny ACEs in the table 905 and it is determined that allow ACEs SG_B and SG_A (corresponding to claim B and claim A) occur in the user claim set 903. That is, two of the user claims A and B match these ACEs (but claim C does not match any of the deny ACEs).

Per block 1611, some embodiments sum the deny ACE resource count, which is represented as S. In some embodiments, this includes functionality as described with respect to the deny ACE component 326 of FIG. 3. For example, referring back to FIG. 9, embodiments sum SG_B, 2 and SG_A, 8 to a total of 10 (8 plus 2) and so 10 represents S. Accordingly, M=5, whereas S=10.

Per block 1615, particular embodiments determine whether M is greater than S. In some embodiments, blocks 1615, 1617, and 1613 includes functionality as described with respect to the grant component 328 of FIG. 3. Per block 1613, if M is not greater than S, then a user is denied access to the concept. For example, referring back to FIG. 9, M is not greater than S because 5 is not greater than 10, therefore access will be denied to the concept. Per block 1616, if M is greater than S then access is granted to the concept.

Various embodiments grant access based on whether M is greater than S based on the following proposition. If it is assumed that no duplicate deny ACEs were found when constructing the aggregated deny ACL, this implies that S is the exact number of resources with deny ACEs. Had there been duplicates, S could only be equal or less. Thus, if M is larger than S, this implies that among the resources referred to by M there must be some resources without any deny ACEs. Further, since the user has access to all resources referred to by M, one can conclude that the user has access to at least (M minus S) resources from which the concept was derived.

In some embodiments, even if the user is not granted access to the concept, the user might still have access to the concept or resources of the concept. The outcome of the process 1600 can thus be a false negative, but there may be no false positives. The efficacy of the approach may be dependent on the prevalence of deny ACEs associated with the corpus of resources. In practice, deny ACEs may be used sparingly.

In some embodiments, duplicate deny ACEs will inflate the S and impact the efficacy of the approach. It is possible to overcome this by replacing the resource counts in the aggregated deny ACL with resource identifiers. For example, an aggregated deny ACL could be: [{SecurityGroup_A, document_i, document_k}, {SecurityGroup_B, document_k}], where document_i and document_k are the resource identifiers. This change enables some embodiments to compute exactly how many resources are protected by deny ACEs occurring in a user claim set, thereby increasing the efficacy of the approach. In light of these resource identifiers, some embodiments additionally or alternatively modify block 1611 in the following way. For each of the ACEs found, insert associated resource identifiers into a set called S' and the size of the set is called S. Compared to counts, the tradeoff of including resource identifiers in the aggregated deny ACL (instead of deny counts) is an increase in the number of bytes needed for representation of the aggregated ACL. Also, some additional CPU and memory may be required in the modified block 1611 to compute S. Whether to user resource counts or resource identifiers are parameters that can be tuned or selected in some embodiments. Some embodiments store resource identifiers up to a certain maximum number (i.e., a threshold number, such as 5 to 10) and then switch to counts. This may represent a tradeoff between approach efficacy and the number of bytes required to represent the aggregated deny ACL.

One potential issue with the modification to block 1611 is that a negative outcome in the modified block 1611 could be false. The implication is that negative outcomes may require an iteration of all resources to determine if the user has access to at least one of the resources, which his described by the "brute-force" approach above. Some embodiments encompass techniques to reduce the cost of this "brute-force" approach by exploiting state in aggregated ACLs or state compute in the blocks of process 1600.

Some embodiments exclude the resources in the set S' computed in the modified block 611 from the resources that must be iterated to determine user access to the concept. One reasoning is that the user may be explicitly denied access to these resources, and as such, they could not be granted user access to the concept if part of the iteration. Further, since all resources that the user could be denied access to have been removed from the iteration, it is also possible to omit checking deny claims during individual resource access control determination. In various embodiments, the representation of ACLs on resources are typically split into two separate data structures—one for allow ACEs and one for deny ACEs. When evaluating access, occurrence of user claims among deny ACEs may be done before a check for allow ACEs. A check for occurrence of deny ACEs can be omitted when the first technique is in use, thus saving both CPU, memory, and potentially also I/O if the deny ACEs are also stored separately from the allow ACEs.

Figure 17:
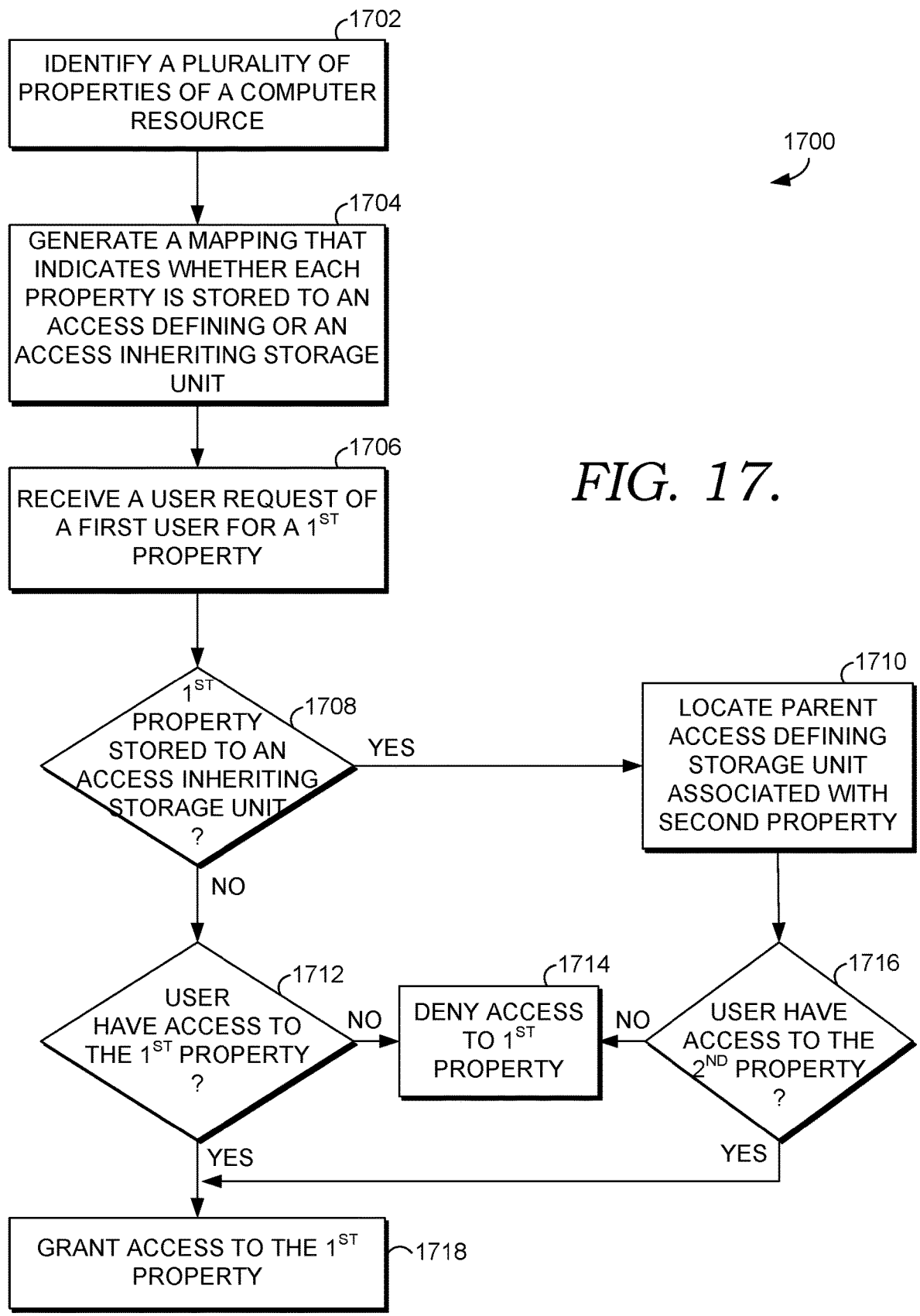
FIG. 17 is a flow diagram of an example process for rendering a property of a given resource, according to some embodiments of this disclosure.

Turning now to FIG. 17, a flow diagram of an example process 1700 for rendering a property of a given resource is illustrated, according to some embodiments. It is understood that more than one property may be rendered and requested. Per block 1702, a plurality of properties of a computer resource are identified. In some embodiments, a plurality of properties of a computer resource is identified where each property of the plurality of properties corresponds to a unique sub-unit of information of the computer resource. For example, referring back to FIG. 11, properties 0, 1, and 2 of the document 1103 may be identified. In some embodiments, the property definition mapper 433 and all of its functionality described with respect to FIG. 4 performs block 1702.

Per block 1704, a mapping that indicates whether each property is stored to an access defining memory storage unit or an access inheriting memory storage unit is generated. For example, the table 1000 of FIG. 10, the table 1107 of FIG. 11, and/or the key-value store 427 of FIG. 4 may indicate this mapping by associating each property to an access defining memory storage unit or access inheriting memory storage unit. In some embodiments, this mapping may include functionality as described with respect to the property definition mapper 433 and/or the access level mapper 435 of FIG. 4. In some embodiments, the access defining memory storage unit corresponds to a parent object and the access inheriting memory storage unit corresponds to a child object of the parent object or another object. For example, referring back to FIG. 12, the resource representation 1202 indicates that the node 1206 indicates that it is a parent object relative to the node 1208.

In some embodiments, the access defining memory storage unit includes an ACL needed to access the first property. For example, referring back to FIG. 11, property 0's access defining memory storage unit includes the ACL "security group A, B." In some embodiments, the access inheriting memory storage unit does not include an ACL needed to access the first property but includes a pointer value that points to the access defining memory storage unit. For example, referring back to FIG. 11, the access inheriting memory storage unit of property 1 may not include an ACL of security group B (only a reference that it requires security group B access level control) but include the reference 1107 that points to the access defining memory storage unit of property 0, which includes the ACL.

In some embodiments, the mapping is included in a key-value store where the key indicates each property ID of the plurality of properties and a set of values include contents for a respective property of the plurality of properties. For example, this is described with respect to the key-value store 427 of FIG. 4. In another example, the table 1000 of FIG. 10 descries this key-value store embodiment.

Per block 1706, a user request of a first user is received for a first property of the plurality of properties. For example, referring back to FIG. 11, a user may only request access to property 1 of the document 1103 of FIG. 11. In some embodiments, property 1 is also inspected, as described by the runtime property inspector 437 of FIG. 4. Per block 1708, it is determined whether the first property is stored to an access inheriting memory storage unit. For example, referring back to FIG. 11, in response to the user request of block 1706, property 1 is located and mapped to the corresponding access inheriting memory storage unit. In some embodiments, block 1706 includes functionality as described with respect to the runtime memory storage unit determiner 439 of FIG. 4. Per block 1710, if the first property is stored to an access inheriting memory storage unit, the parent access defining memory storage unit associated with a second property is located. For example, referring back to FIG. 11, using the pointer 1107, the access defining memory storage unit of property 0 is located from the access inheriting memory storage unit of property 1. In another example, referring back to FIG. 12, node 1206 may be located based on its relationship to node 1210. In some embodiments, block 1710 includes functionality as described with respect to the runtime memory storage unit determiner 439 of FIG. 4.

Per block 1716, in response to block 1710 or based on the determining that the first property is stored to an access inheriting memory storage unit, it is determined whether the user has access to the second property corresponding to the parent object. For example, referring back to FIG. 11, it is determined whether the user claim set 1105 includes security group A and security group B, since this is the ACL needed for access of this property 0. In some embodiments, block 1716 includes functionality as described with respect to the access level determiner 449 of FIG. 4.

Per block 1714, if the user does not have access to the second property, then the user is denied access to the first property. For example, referring back to FIG. 11, if the user claim set 1105 did not include claim A (corresponding to security group A), the user may not be granted access to property 1, since property 0 requires security group A, which the user does not have. In these embodiments, functionality refrains from presenting, to a user device, the first property based on determining that the user does not have access to the second property corresponding to the parent object.

Per block 1718, if the user does have access to the second property corresponding to the parent object, the user is granted access to the first property. For example, referring back to FIG. 11, because the user claim set 1105 includes all the required access control level identifiers needed to grant access to property 0 (i.e., security group A, B), the user is granted access to property 1, which is the property that the user requested. In these embodiments, functionality presents, to a user device, the first property based on determining that the user has access to the second property corresponding to the parent object. In various embodiments, blocks 1714 and 1718 includes functionality as described with respect to the access level determiner 449 of FIG. 4.

Per block 1712, if the first property is stored to the access inheriting memory storage unit, it is determined whether the user has access to the first property. For example, referring back to FIG. 11, if the user with the claim set A, B, and C, instead or in addition requested property 0, embodiments can directly determine whether the user has access to the first property. This is because access defining memory storage units may store ACLs and are parent objects or are associated with parent objects. Accordingly, no pointer or reference is needed to another memory storage unit. Per block 1714, if the user does not have access to the first property, the user is denied access to the first property. Per block 1718, if the user does have access to the first property, the user is granted access to the first property.

Figure 18:
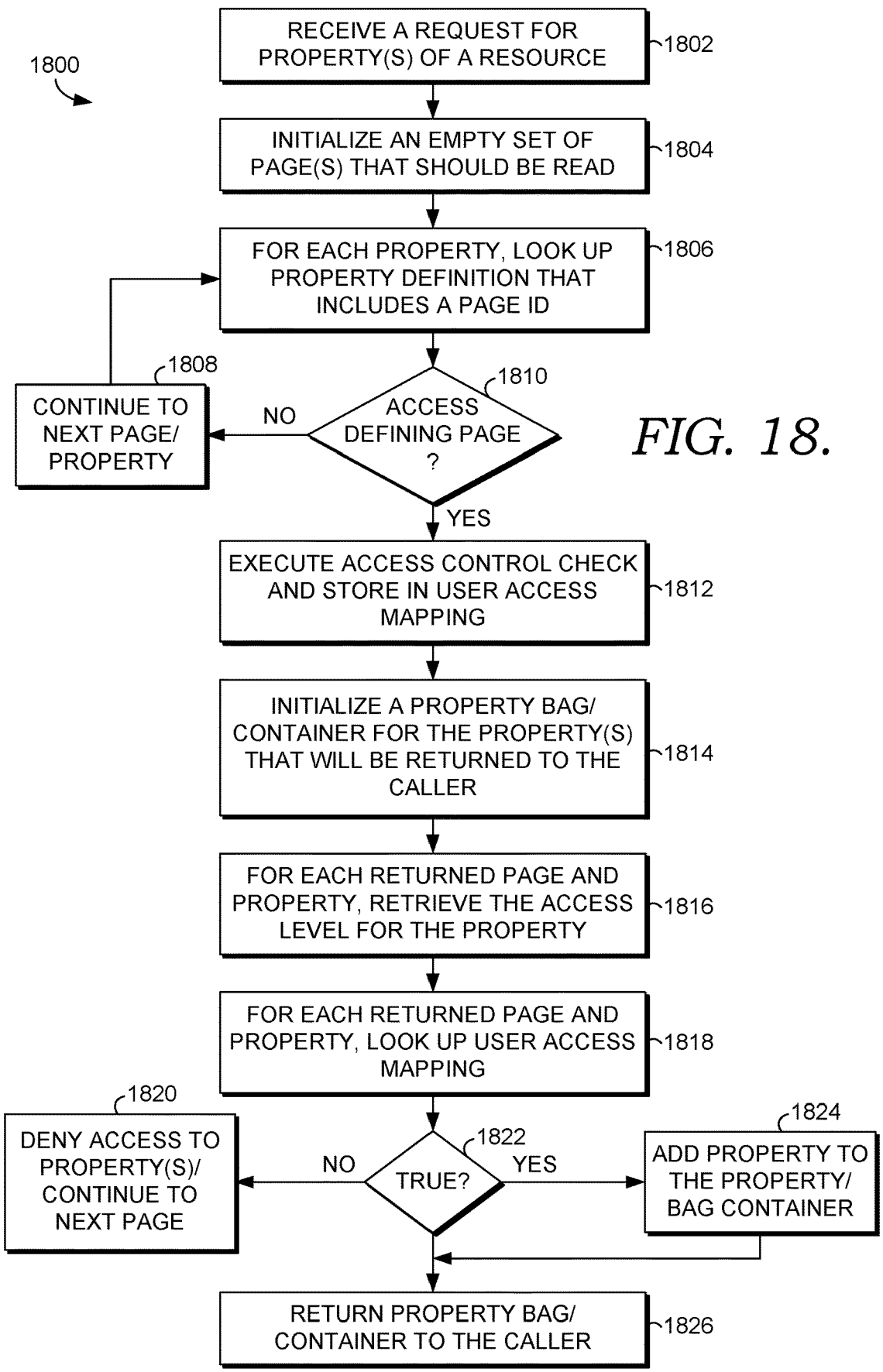
FIG. 18 is a flow diagram of an example process for returning one or more properties of a resource to a caller, according to some embodiments of this disclosure.

Turning now to FIG. 18, a flow diagram of an example process 1800 for returning one or more properties of a resource to a caller is illustrated, according to some embodiments. In some embodiments, the process 1800 represents or includes the functionality as described with respect to the runtime property object returner 447 of FIG. 4. Accordingly, the process 1800 may represent runtime functionality where a user requests one or more properties of a resource, which are eventually provided to a user or denied access to a user.

Per block 1802, a request for one or more properties of a resource are received. For example, referring back to FIG. 11, the user having the claim set 1105 may send the query to access property 1 of the document 1103. When executing a query, the caller (e.g., a service or an end user) specifies the properties that should be returned. For instance, an example interface/API is as follows: Item GetItem (ItemId id, List, <string> selectedProperties, claimset userClaimset). When the query is received, the requested properties are inspected (e.g., as described with respect to the runtime property inspector 437), and the set of pages that are to be read are determined. In some embodiments, this is done using the property definition tables and access level tables described above with respect to the key-value store 427.

Per block 1804, an empty set of one or more pages that should be read are initialized. For example, referring back to FIG. 11, because the user has requested property 1, the access inheriting page's ID of property 1 of the table 1107 is initialized into a set. In some embodiments, this is performed as described with respect to the runtime property inspector 437 of FIG. 4. Per block 1806, for each requested property, some embodiments look up the property definition that includes a page ID. For example, using the illustration above, embodiments responsively look up the access inheriting page of table 1107's property definition. In some embodiments, the property definition is looked up in the property definition table, as described with respect to the key-value store 427. This may include adding the page identifier from the property definition to the set. This may also include using the access control level identifier from the property definition as the key, and looking up the page ID on which the property ACL is stored in the access level table. Particular embodiments may then add the page ID to the set.

Per block 1810, it is determined whether a first property of the one or more properties requested is stored to an access defining page (or an access inheriting page). In some embodiments, this determination includes functionality as described with respect to the runtime memory storage unit determiner 439 of FIG. 4. Per block 1808, if the first page is not an access defining page (e.g., it is an access inheriting page), some embodiments continue to the next page/property by perform a loop until an access defining page associated with the resource is located. For example, referring back to FIG. 11. In response to receiving a request for property 1, particular embodiments would determine that property 1 is stored to an access inheriting page and keep reading the other properties (0 and 2) within the table 1107 until the access defining page is located (and/or use the pointer value 1107).

Per block 1812, if the page is an access defining page, an access control check is executed and stored in a user access mapping. In some embodiments, block 1812 is or includes the functionality as described with respect to the access level determiner 449. In an illustrative example, if the page is an access defining page, particular embodiments execute the access control check using the ACL present on the page and the user claim set. In some embodiments, the result is stored in a mapping data structure (a user access mapping) where the key is the access control level, and the value is a Boolean (True or False) indicating whether the user has access or not.

Per block 1814, a property bag and/or container for the one or more properties that will be returned to the caller are initialized. In some embodiments, this (as well as blocks 1816, 1818, 1820, 1824, and 1826) represents or includes functionality as described with respect to the property adding component 451. Per block 1816, for each returned page and property, the access level for the property is retrieved. For example, using the property name, a lookup is performed in the property definition table and the access control level identifier(s) is returned for the property. Additionally, using the retrieved access level, some embodiments do a lookup in the user access mapping. This corresponds to determining whether the Boolean value described above with respect to block 1812 is true or false. Per block 1824, if the value is true, embodiments add the property to the property/bag container described above with respect to block 1812. Per block 1820, if the value is not true (i.e., it is false), embodiments deny access for a given analyzed property. If the user has requested more than one property, embodiments continue to the next page/property and block 1822 is repeated. Per block 1826, the property back/container is returned to the caller. For example, referring back to FIG. 11, because the user issued a query for property 1, property 1 and its contents are placed in a property bag and returned to the client. In some embodiments, additional properties are also returned to the client. For example, referring back to FIG. 11, property 0 and its contents may also be surfaced to the user since the user also has access to property 0 even though the caller did not call for this property.

Having described various implementations, an exemplary computing environment suitable for implementing embodiments of the disclosure is now described. With reference to FIG. 7, an exemplary computing device is provided and referred to generally as computing device 1900. The computing device 1900 is but one example of a suitable computing environment and is not intended to suggest any limitation as to the scope of use or functionality of embodiments of the disclosure. Neither should the computing device 1900 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 19, computing device 1900 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 19 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 19 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 19 and with reference to "computing device."

Computing device 1900 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 1900 includes one or more processors 14 that read data from various entities such as memory 12 or I/O components 20. Presentation component(s) 16 presents data indications to a user or other device. In some implementations presentation component 220 (and/or 320, 420) of system 200 may be embodied as a presentation component 16. Other examples of presentation components may include a display device, speaker, printing component, vibrating component, and the like.

The I/O ports 18 allow computing device 1900 to be logically coupled to other devices, including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1900. The computing device 1900 may be equipped with depth cameras, such as stereoscopic camera systems, infrared camera systems, RGB camera systems, and combinations of these, for gesture detection and recognition. Additionally, the computing device 1900 may be equipped with accelerometers or gyroscopes that enable detection of motion. The output of the accelerometers or gyroscopes may be provided to the display of the computing device 1900 to render immersive augmented reality or virtual reality.

Some embodiments of computing device 1900 may include one or more radio(s) 24 (or similar wireless communication components). The radio 24 transmits and receives radio or wireless communications. The computing device 1900 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

Clause 1. A computerized system comprising: one or more processors; and computer storage memory having computer-executable instructions stored thereon which, when executed by the one or more processors, implement a method comprising: resources and one or more access control levels needed to access each computer resource of the plurality of computer resources, wherein the concept corresponds to a class of information and the plurality of computer resources corresponds to information related to the concept; receiving a user request of a user, wherein the user request includes the concept; based on the one or more mappings, determining that a first access control level is required to access a first computer resource of the plurality of computer resources and a second access control level different than the first access control level is required to access a second computer resource of the plurality of computer resources; comparing the first access control level and the second access control level with one or more access credentials of the user; and based at least in part on the determining and the comparing, providing access to at least the first computer resource to a user device associated with the user.

Clause 2. The system of clause 1, further comprising denying the user access to the second computer resource based at least in part on the comparing.

Clause 3. The system of clause 2, the method further comprising: receiving a user request associated with a second user, wherein the second request includes the concept; using the one or more mappings, determining that the second user has access to the second computer resource but not the first computer resource; and based at least in part on the determining, providing the second computer resource to another user device associated with the second user.

Clause 4. The system of clause 1, wherein the one or more mappings include a first data structure that maps the concept to a plurality of computer resource IDs corresponding to the plurality of computer resources.

Clause 5. The system of clause 4, wherein the one or more mappings include a second data structure that maps each computer resource ID of the plurality of computer resource IDs to a respective ACL, wherein the ACL includes one or more access control level identifiers that indicate one or more access control levels needed to access a respective computer resource, and wherein the first data structure is an auxiliary data structure that references the second data structure in response to the receiving of the user request.

Clause 6. The system of clause 1, the method further comprising generating metadata associated with each computer resource of the plurality of computer resource, wherein the metadata includes information describing how the concept is associated with the plurality of computer resources.

Clause 7. A computer-implemented method comprising: generating a first data structure that includes a mapping of a plurality of concepts to computer resource IDs, wherein each concept of the plurality of concepts is mapped to a plurality of computer resource IDs as a single entry within the first data structure; generating a second data structure that includes a mapping from the plurality of computer resource IDs to respective access control lists (ACL), wherein each computer resource ID is mapped to a particular ACL, and wherein the ACL indicates one or more access control levels required to access a particular resource associated with the computer resource ID; and using the first data structure and the second data structure, executing a query associated with a particular concept.

Clause 8. The method of clause 8, wherein the first data structure is a key-value data structure and each concept of the plurality of concepts represents a key, and wherein each key references a set of values corresponding to a respective computer resource ID, and wherein the first data structure is an auxiliary data structure where each requested concept references one or more corresponding keys of the second data structure that represent one or more resources that a user has requested.

Clause 9. The method of clause 8, wherein the second data structure is a key-value data structure indicating that each resource ID of the plurality of resource IDs is a key, and each key references a set of values corresponding to the particular ACL needed to access a corresponding resource associated with the resource ID.

Clause 10 The method of clause 8, further comprising generating metadata associated with each computer resource of the plurality of computer resource, wherein the metadata includes a timestamp indicating when a concept of the each computer resource was associated with the each computer resource and a relationship type indicating how the concept is associated with the each computer resource.

Clause 11. The method of clause 10, further comprising receiving a request for a first concept of the plurality of concepts, the request is associated with a first user; in response to the receiving of the request, locating the first concept in the first data structure and associating, via the first data structure, the first concept to a first plurality of computer resource IDs, the first plurality of computer resource IDs corresponding to a plurality of computer resources that are associated with the first concept; in response to the associating, mapping, via the second data structure, each computer resource ID of the first plurality of computer resource IDs to a respective ACL; and in response to the mapping, determining whether the first user's access credentials are included in the respective ACL for each computer resource ID of the first plurality of computer resource IDs.

Clause 12. The method of clause 11, further comprising: based at least in part on the determining of whether the first user' access credentials are included in the respective ACL, determining that the first user has access to a first computer resource of the plurality of computer resources and does not have access to a second computer resource of the plurality of computer resources; and based at least in part on the determining that the first user has access to the first computer resource and not the second computer resource, providing, to a user device associated with the first user, the first computer resource only.

Clause 13. The method of clause 12, further comprising providing, to a second user device associated with a second user, the second computer resource based at least in part on using the first data structure and the second data structure.

Clause 14. The method of clause 11, further comprising generating an aggregated ACL data structure, wherein the generating of the aggregated ACL data structure aggregates a plurality of different ACLs associated with different computer resources of a first concept into a single record and removes duplicate ACLs.

Clause 15. One or more computer storage media having computer-executable instructions embodied thereon that, when executed, by one or more processors, cause the one or more processors to perform a method, the method comprising: identifying a plurality of properties of a computer resource, wherein each property of the plurality of properties corresponds to a unique sub-unit of information of the computer resource; generating a mapping that indicates whether each property of the plurality of properties is stored to an access defining memory storage unit or an access inheriting memory storage unit, wherein the access defining memory storage unit corresponds to a parent object and the access inheriting memory storage unit corresponds to a child object of the parent object or another object; receiving a request of a first user for a first property of the plurality of properties; determining that the first property is the access inheriting memory storage unit; based on the determining, determining whether the first user has access to a second property corresponding to the parent object; and based on the determining whether the first user has access to the second property corresponding to the parent object, denying or granting access for the first property.

Clause 16. The computer storage media of clause 15, wherein the access defining memory storage unit includes an ACL needed to access the first property.

Clause 17. The computer storage media of clause 16, wherein the access inheriting memory storage unit does not include an ACL needed to access the first property but includes a pointer value that points to the access defining memory storage unit.

Clause 18. The computer storage media of clause 15, wherein the mapping is included in a key-value store where the key indicates each property ID of the plurality of properties and a set of values include contents for a respective property of the plurality of properties.

Clause 19. The computer storage media of clause 15, the method further comprising presenting, to a user device, the first property based on determining that the user has access to the second property corresponding to the parent object.

Clause 20. The computer storage media of clause 15, the method further comprising refraining from presenting, to a user device, the first property based on determining that the user does not have access to the second property corresponding to the parent object.

What is claimed is:

1. A computerized system comprising:

one or more processors; and computer storage memory having computer-executable instructions stored thereon which, when executed by the one or more processors, implement a method comprising:

generating a first mapping that identifies a concept and a plurality of computer resources, the first mapping associating the concept the plurality of computer resources; wherein the concept corresponds to a class of information and the plurality of computer resources include information related to the concept;

generating a second mapping that is different from the first mapping and that associates access control lists (ACLs) with the plurality of computer resources associated with the concept, wherein an ACL associated with each computer resource of the plurality of computer resources indicates an access control level needed to access the computer resource;

receiving a query from a user identifying the concept;

in response to receipt of the query identifying the concept, retrieving an index record for the concept from the first mapping, the index record identifying the plurality of computer resources that include the information related to the concept;

accessing the second mapping to identify the ACL governing access to each of the plurality of computer resources identified in the index record for the concept;

based on the second mapping, determining that a first access control level is required to access a first computer resource of the plurality of computer resources associated with the concept and that a second access control level is required to access a second computer resource of the plurality of computer resources associated with the concept;

comparing the first access control level and the second access control level with one or more access credentials of the user; and based at least in part on the determining and the comparing, providing the user with access to the first computer resource to a user device in response to the query from the user.

2. The computerized system of claim 1, further comprising denying the user access to the second computer resource based at least in part on the comparing.

3. The computerized system of claim 2, the method further comprising:

receiving a second request associated with a second user, wherein the second request includes the concept;

using the first mapping and the second mapping, determining that the second user has access to the second computer resource but not the first computer resource; and based at least in part on the determining, providing the second computer resource to another user device associated with the second user.

4. The computerized system of claim 1, wherein providing the user with access to the first computer resource includes generating a view of the concept that identifies the first computer resource and that does not identify the second computer resource.

5. The computerized system of claim 1, wherein the second mapping maps each computer resource ID of a plurality of computer resource IDs to a respective ACL of the ACLs, wherein the ACL includes one or more access control level identifiers that indicate one or more access control levels needed to access a respective computer resource, and wherein the first mapping is an auxiliary data structure that references the second mapping in response to receipt of the query.

6. The computerized system of claim 1, the method further comprising generating metadata associated with each computer resource of the plurality of computer resources, wherein the metadata includes information describing how the concept is associated with the plurality of computer resources.

7. The computerized system of claim 1, wherein the concept includes a project title or meeting topic.

* * * * *